United States Patent
Nishiyama

(10) Patent No.: US 11,394,841 B2
(45) Date of Patent: Jul. 19, 2022

(54) IMAGE READING APPARATUS, IMAGE READING METHOD, AND STORAGE MEDIUM TO ACCOUNT FOR PAPER THICKNESS

(71) Applicant: CANON KABUSHIKI KAISHA, Tokyo (JP)

(72) Inventor: Kaori Nishiyama, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/145,055

(22) Filed: Jan. 8, 2021

(65) Prior Publication Data
US 2021/0234980 A1    Jul. 29, 2021

(30) Foreign Application Priority Data
Jan. 24, 2020 (JP) .............................. JP2020-010143

(51) Int. Cl.
*H04N 1/04* (2006.01)
*H04N 1/00* (2006.01)

(52) U.S. Cl.
CPC ....... *H04N 1/00652* (2013.01); *H04N 1/0057* (2013.01); *H04N 1/00689* (2013.01); *H04N 1/00694* (2013.01); *H04N 1/00716* (2013.01); *H04N 1/00771* (2013.01)

(58) Field of Classification Search
None
See application file for complete search history.

(56) References Cited

U.S. PATENT DOCUMENTS

| | | | |
|---|---|---|---|
| 7,890,004 B2* | 2/2011 | Fujii | G03G 15/5029 399/45 |
| 9,549,092 B2* | 1/2017 | Kitahara | H04N 1/00925 |
| 2007/0206235 A1* | 9/2007 | Ikeno | H04N 1/4092 358/474 |
| 2016/0094750 A1* | 3/2016 | Kitahara | H04N 1/00925 358/1.13 |
| 2016/0170692 A1* | 6/2016 | Osada | H04N 1/2104 358/1.15 |
| 2016/0295045 A1* | 10/2016 | Saiki | H04N 1/0032 |
| 2018/0109692 A1* | 4/2018 | Kikuchi | G03G 15/6567 |
| 2018/0255194 A1* | 9/2018 | Osada | H04N 1/00411 |
| 2018/0376021 A1* | 12/2018 | Koyanagi | H04N 1/00729 |
| 2019/0052767 A1* | 2/2019 | Nagano | H04N 1/123 |
| 2019/0068811 A1* | 2/2019 | Totsuka | H04N 1/00472 |
| 2020/0145547 A1* | 5/2020 | Kitsuki | H04N 1/00777 |

FOREIGN PATENT DOCUMENTS

JP    H0624604 A    2/1994

* cited by examiner

*Primary Examiner* — Dung D Tran
(74) *Attorney, Agent, or Firm* — Canon U.S.A., Inc. I.P. Division

(57) ABSTRACT

An image reading apparatus includes a detection unit, a display unit, a conveyance control unit, and a reading unit. The detection unit detects that a document is placed on a document tray. When the detection unit detects that the document is placed on the document tray, the display unit displays an object related to setting of a thickness of the document if a predetermined function is not being performed. The conveyance control unit conveys the document based on information indicating the document thickness set via the object. The reading unit reads an image of the conveyed document.

13 Claims, 18 Drawing Sheets

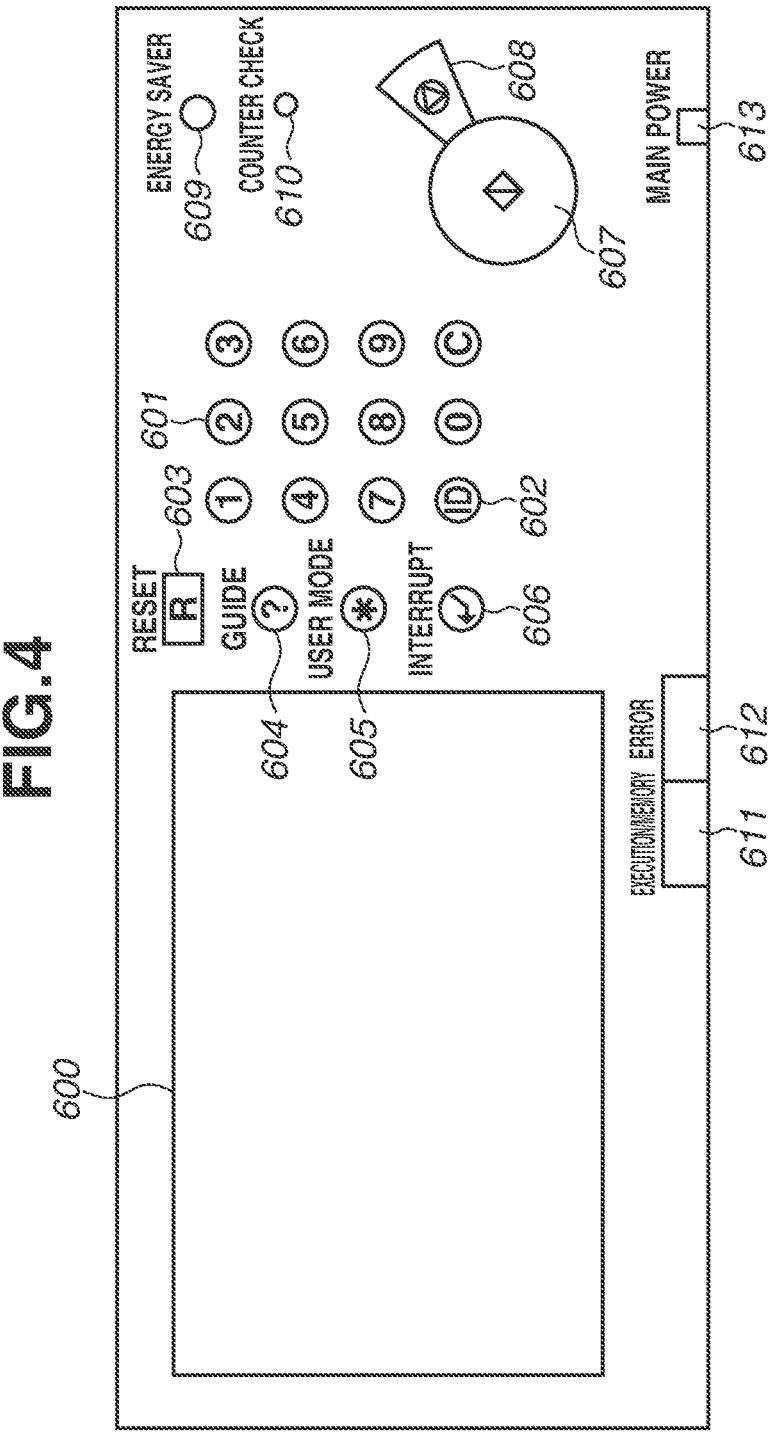

FIG.7

| 700 | APPARATUS SETTINGS | |
|---|---|---|
| 701 | PAPER THICKNESS SELECTION METHOD | FIXED SETTING |
| 702 | FIXED PAPER THICKNESS SETTING | THICK PAPER |
| 703 | SPECIFIED PAPER THICKNESS SETTING | — |
| | . . . . | . . . . |
| 710 | COPY SETTINGS | |
| 711 | PAPER THICKNESS SETTING | THICK PAPER |
| 712 | PAGE PRINTING | ON |
| 713 | N-IN-ONE PRINTING | OFF |
| 714 | BOOKBINDING | OFF |
| 715 | NUMBER OF COPIES | 5 |
| | . . . . | . . . . |

IMAGE READING APPARATUS, IMAGE READING METHOD, AND STORAGE MEDIUM TO ACCOUNT FOR PAPER THICKNESS

BACKGROUND

Field

The present disclosure relates to an image reading apparatus, an image reading method, and a storage medium.

Description of the Related Art

When a thick paper document is read by using an automatic document conveyance apparatus, a load on a conveyance roller increases at a curved portion of a conveyance path, which is likely to cause a paper jam. When a thin paper document is read by using an automatic document conveyance apparatus, it takes time for a document sheet to be discharged and dropped completely on the discharge unit because the weight of the document itself is light. This may cause the trailing edge of the document sheet to hit the leading edge of the next sheet, resulting in a paper jam or a stacking failure.

Japanese Patent Application Laid-Open No. 6-24604 discusses a conventional automatic document conveyance apparatus that prompts the user to select a document paper thickness from thin paper, thick paper, and plain paper or detects the paper thickness to change the document conveyance speed based on the paper thickness.

To automatically detect the paper thickness, it is necessary to add a sensor to the automatic document conveyance apparatus, resulting in a cost increase.

SUMMARY

According to an aspect of the present disclosure, an image reading apparatus includes a detection unit configured to detect that a document is placed on a document tray, a display unit, wherein, when the detection unit detects that the document is placed on the document tray, the display unit is configured to display an object related to setting of a thickness of the document if a predetermined function is not being performed, a conveyance control unit configured to convey the document based on information indicating the document thickness set via the object, and a reading unit configured to read an image of the conveyed document.

Further features of the present disclosure will become apparent from the following description of exemplary embodiments with reference to the attached drawings.

BRIEF DESCRIPTION OF THE DRAWINGS

FIG. 4 is a diagram illustrating an operation unit.

FIG. 7 is a diagram illustrating a structure of setting values stored in a read only memory (RAM).

DESCRIPTION OF THE EMBODIMENTS

If an automatic document conveyance apparatus is configured to, each time a document is placed thereon, automatically display a screen for selecting the thickness of the document, the following may arise. Even if the user thinks it unnecessary to set the thickness of the document, the screen for setting the thickness of the document is displayed, which is troublesome for the user. Examples of situations where the user thinks it unnecessary to set the thickness of a document include a situation where the user uses the function of reading a printed test page using the automatic document conveyance apparatus to correct the gradation, density, and tint of an image (hereinafter the function is referred to as the automatic gradation correction function). In a case where the automatic gradation correction function is used, it is troublesome that the screen for selecting the thickness of the document is displayed, because it is unlikely that the automatic gradation correction function is performed with a document having a special thickness.

The present disclosure is directed to offering a mechanism for preventing display of a document thickness selection screen depending on the function being performed, thereby improving user operability.

The present disclosure makes it possible to offer a mechanism for preventing display of a document thickness selection screen depending on the function being performed, thereby improving user operability.

Exemplary embodiments of the present disclosure will be described below with reference to the accompanying drawings.

Figure 1:
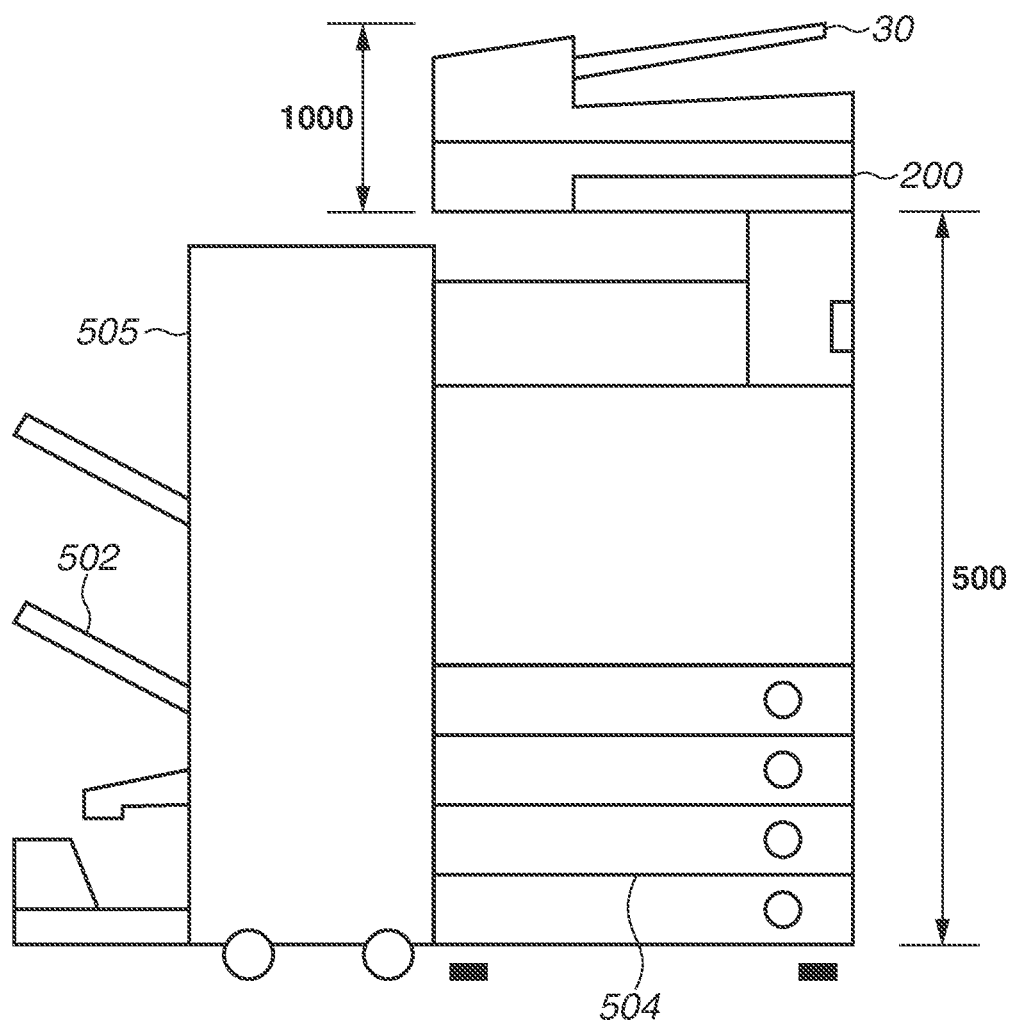
FIG. 1 is a diagram illustrating an example of an external appearance of an image forming apparatus.

FIG. 1 illustrates an example of an external appearance of an image forming apparatus.

The image forming apparatus according to a first exemplary embodiment includes an image reading unit 200 and an image forming unit 500.

The image reading unit 200 exposes and scans an image on a document by using light emitted from an illumination lamp, and inputs obtained reflected light to a linear image sensor (charge coupled device (CCD) sensor) to convert image information into an electrical signal. The image reading unit 200 converts the electrical signal into a luminance signal including red (R), green (G), and blue (B)

colors, and outputs the luminance signal as image data to a controller unit 400 (refer to FIG. 3) of the image forming apparatus.

A document is placed on a document tray 30 of an automatic document feeder unit (hereinafter referred to as an ADF) 1000.

When the user issues an instruction to perform document read processing via an operation unit 405 (refer to FIG. 3) of the image forming apparatus, the controller unit 400 of the image forming apparatus transmits a document read instruction to the image reading unit 200. Upon receipt of the instruction, the image reading unit 200 feeds document sheets one by one from the document tray 30 of the ADF 1000 and reads the document. The user can also issue an instruction to read a document placed on a platen glass 202 (described below).

The image forming unit 500 is an image forming device for forming an image on paper based on image data received from the controller unit 400 (described below).

The image forming method according to the present exemplary embodiment is an electrophotographic method using photosensitive drums and a photosensitive belt. The image forming unit 500 includes, as a paper feed unit 504, a plurality of cassettes supporting different paper sizes or different paper orientations. A paper discharge unit 502 discharges paper subjected to printing. A finisher unit 505 performs postprocessing including stapling and punching based on user settings.

Figure 2:
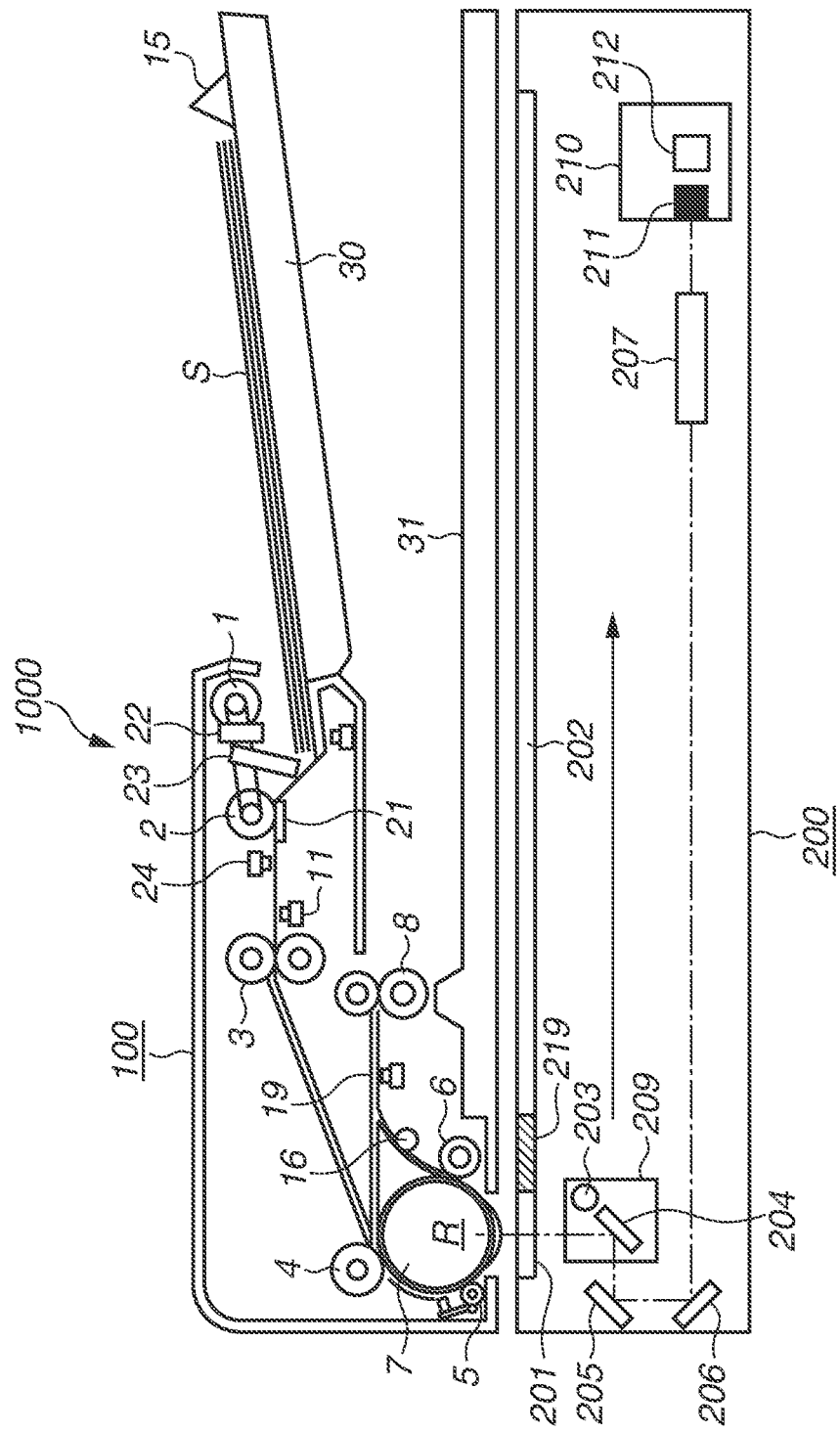
FIG. 2 is a cross-sectional view schematically illustrating an example of a configuration of an automatic document feeder unit (ADF).

FIG. 2 is a cross-sectional view schematically illustrating an example of a configuration of the ADF 1000 that includes an ADF function unit 100 and the image reading unit 200.

Operation of the ADF 1000 will be described next with reference to FIG. 2. The ADF 1000 illustrated in FIG. 2 includes the document tray 30 for stacking a document bundle S including one or more document sheets, a separation pad 21 for preventing the document bundle S from protruding from the document tray 30 and advancing to the downstream side before start of conveyance, and a feed roller 1. The ADF 1000 further includes a document detection sensor 23 for detecting that the document bundle S is placed on the document tray 30, a distance measurement sensor 22 for measuring the distance to the uppermost surface of the document bundle S, and a separation sensor 24 for detecting that a document has passed through a separation roller 2. The document detection sensor 23 may be disposed under the document tray 30 to detect that the document bundle S is placed thereon. When the feed roller 1 moves down to the document surface of the document bundle S stacked on the document tray 30 and then rotates, the uppermost document sheet of the document bundle S is fed. The document sheet conveyed by the feed roller 1 is separated as a single sheet by the action of the separation roller 2 and the separation pad 21. This separation operation is implemented by a retard separation technique. At this time, if the separation sensor 24 cannot detect a document after a predetermined period of time (t1) has elapsed since start of conveying the document, the driving of the feed roller 1 is stopped. The predetermined period of time (t1) is the sum of the time from when the document starts to be conveyed to when the document reaches the separation sensor 24, which is estimated based on the conveyance speed, and a sufficient margin considering a delay.

The document separated by the separation roller 2 and the separation pad 21 is conveyed to a registration roller 4 by a conveyance roller 3 and is abutted against the registration roller 4. This causes the document to form a loop, thereby correcting the skew of the document being conveyed. A paper feed path is disposed on the downstream side of the registration roller 4. The paper feed path is used to convey the document having passed through the registration roller 4 toward an image reading glass 201.

The document fed to the paper feed path is further fed onto the platen glass 202 by a large roller 7 and a conveyance roller 5. At this time, the large roller 7 comes in contact with the image reading glass 201. The document conveyed by the large roller 7 passes through a conveyance roller 6, moves between a roller 16 and a movement glass, and then is discharged to a document discharge tray 31 via a discharge flapper and a discharge roller 8.

The ADF 1000 illustrated in FIG. 2 is designed to read the image on the back side of the document by reversing the document. In the ADF 1000, when the discharge roller 8 is reversed and the discharge flapper is switched in a state where the document is caught by the discharge roller 8, the document is moved to a reversing path 19. In the ADF 1000, when the document moved to the reversing path 19 is abutted against the registration roller 4 and the document forms a loop again, the skew of the document being conveyed is corrected. Then, in the ADF 1000, when the conveyance roller 5 and the large roller 7 move the document to the image reading glass 201 again, the back side of the document can be read on the image reading glass 201.

The document tray 30 is provided with a guide regulation plate 15 that is slidable in the sub scanning direction of the stacked document bundle S. The document tray 30 is also provided with a document width detection sensor (not illustrated) for detecting the document width in conjunction with the guide regulation plate 15. The combination of the document detection sensor 23 and a pre-registration sensor 11 makes it possible to determine the document size of the document bundle S stacked on the document tray 30. In addition, a document length detection sensor (not illustrated) provided in the conveyance path makes it possible to detect the document length based on the conveyance distance in the period from when the leading edge of the document being conveyed is detected to when the trailing edge thereof is detected. The document size can also be determined using the combination of the detected document length and the document width detection sensor.

(Example of Configuration of Image Reading Unit 200)

In the image reading unit 200, an optical scanner unit 209 scans the document on the platen glass 202 in the sub scanning direction indicated by the arrow illustrated in FIG. 2, to optically read image information recorded on the document. The image reading unit 200 also controls the ADF 1000 to convey the document sheets on the document tray 30 one by one to the reading position. The image reading unit 200 further moves the optical scanner unit 209 to the reading center position of the large roller 7 of the ADF 1000 and then reads the document at the reading position of the large roller 7. The document on the ADF 1000 or the platen glass 202 is read by an optical system including the image reading glass 201, the platen glass 202, the optical scanner unit 209 having a lamp 203 and a mirror 204, mirrors 205 and 206, a lens 207, and a CCD sensor unit 210. The read image information is photoelectrically converted and then input as image data to the controller unit 400 (refer to FIG. 3). A white plate 219 is used to generate white level reference data for shading.

In the present exemplary embodiment, the CCD sensor unit 210 includes a color image reading (RGB) CCD (3-line sensor unit) 212 and a monochrome image reading CCD (1-line sensor unit) 211.

In the present exemplary embodiment, the image reading unit 200 that reads the image on the back side of the document after reversal of the document by the ADF 1000 has been described as an example. Alternatively, the image reading unit 200 may include both a CCD for reading the front side of the document, and a CCD for reading the back side of the document, to read both sides of the document during one-time conveyance of the document.

(ADF 1000)

Figure 3:
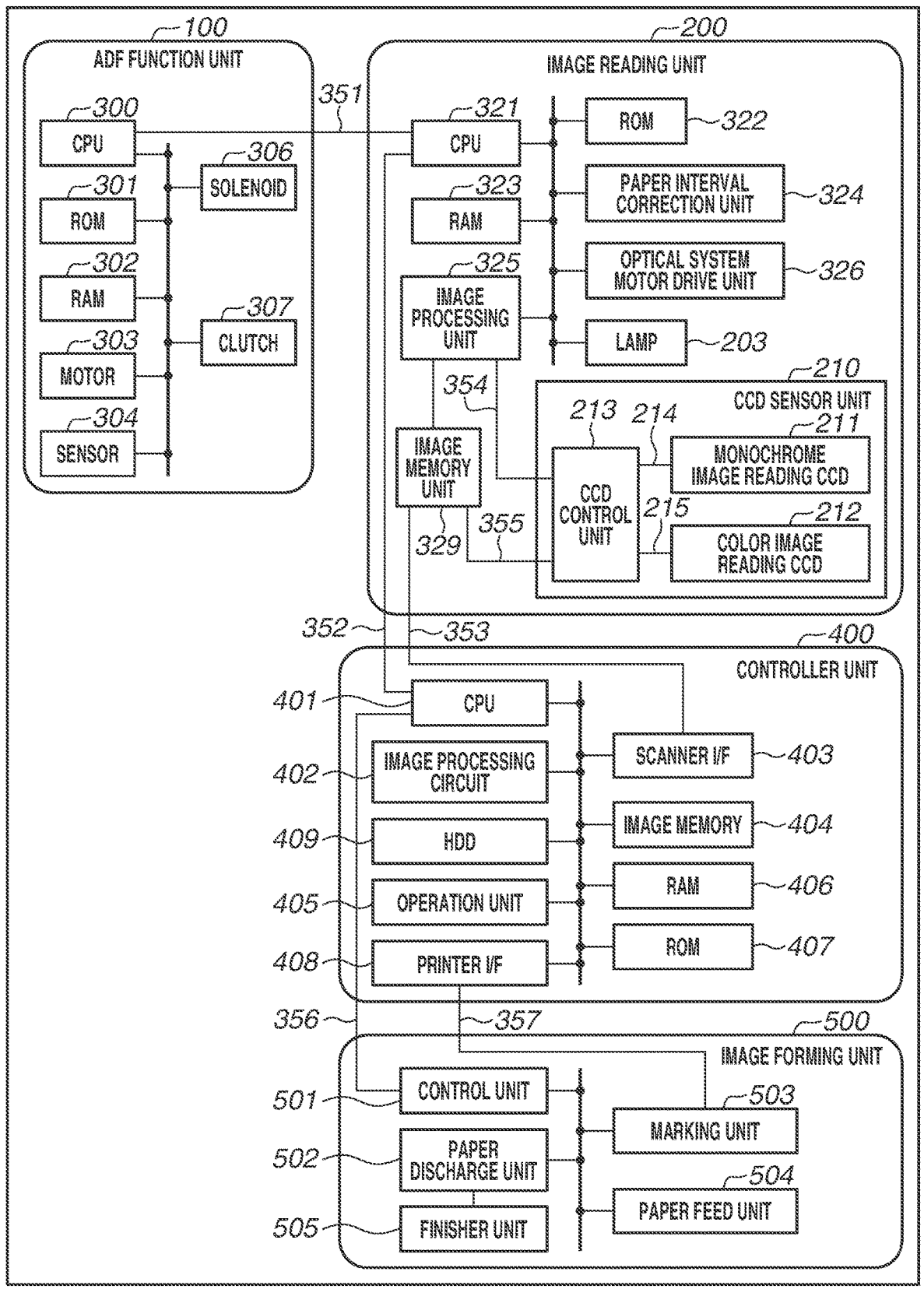
FIG. 3 is a block diagram illustrating a configuration of the image forming apparatus.

FIG. 3 illustrates an example of a configuration of the image forming apparatus.

The ADF 1000 includes a central processing unit (CPU) 300, a read only memory (ROM) 301, a random access memory (RAM) 302, an output port, and an input port. The ROM 301 stores a control program and fixed parameters. The RAM 302 stores input data and work data.

The output port is connected with a motor 303 for driving various conveyance rollers, a solenoid 306, and a clutch 307. The input port is connected with various sensors 304.

The CPU 300 controls the conveyance of paper based on a control program stored in the ROM 301 connected thereto through a bus line. The CPU 300 performs serial communication with a CPU 321 of the image reading unit 200 via a control communication line 351 to transmit and receive control data to/from the image reading unit 200. In addition, the CPU 300 notifies the image reading unit 200 of a drawing point signal serving as a reference for the leading edge of document image data, via the control communication line 351.

Furthermore, the CPU 300 notifies the image reading unit 200 of the values of the various sensors 304 based on the control data from the CPU 321 of the image reading unit 200.

(Image Reading Unit 200)

In the image reading unit 200, the CPU 321 controls the entire image reading unit 200. The CPU 321 is connected with a ROM 322 storing a program, and a RAM 323 offering a work area. The RAM 323 indicates a work area including a nonvolatile storage area.

An optical system motor drive unit 326 is a driver circuit for driving an optical system drive motor. An image processing unit 325 is connected with the lamp 203 and the CCD sensor unit 210 (including the monochrome image reading CCD 211 for front-side images and the color image reading CCD 212 for front-side images). The CPU 321 controls the optical system motor drive unit 326 to control the CCD sensor unit 210 via the image processing unit 325, thereby performing image read processing.

To implement the conveyance of paper, the CPU 321 transmits a paper conveyance control instruction (command) to the CPU 300 for paper conveyance control of the ADF 1000 via the control communication line 351. Upon receipt of the instruction, the CPU 300 monitors the various sensors 304 disposed on the conveyance path, and drives the motor 303, the solenoid 306, and the clutch 307 for conveying the paper, thereby implementing the conveyance of paper. In this way, the CPU 321 controls the paper conveyance by the ADF 1000 and the image reading by the image reading unit 200. A paper interval correction processing unit 324 corrects a conveyance interval between sheets.

An image signal of the image formed on the CCD sensor unit 210 (either the color image reading (RGB) CCD 212 or the monochrome image reading CCD 211) by the lens 207 is converted into digital image data. The image data is subjected to shading and other various image processing for detection and correction of streaks in the image data by the image processing unit 325 and then written to an image memory unit 329.

The data written to the image memory unit 329 is sequentially transmitted to the controller unit 400 via an image data information communication line 353 that serves as a controller interface including an image transfer clock signal line. Furthermore, the output timing of the drawing point signal serving as the reference for the leading edge of document image data is adjusted by the CPU 321, and then the notification of the drawing point signal is provided to the controller unit 400 via a control communication line 352 as a controller interface. Likewise, the output timing of the drawing point signal of which notification is provided from the ADF 1000 via a communication line is adjusted by the CPU 321 of the image reading unit 200, and then the notification of the drawing point signal is provided to the controller unit 400 via the control communication line 352 as a controller interface.

The CPU 321 controls the image processing unit 325 connected on a control bus line. The CPU 321 further transmits a control signal from a control communication line 354 to the CCD sensor unit 210 via the image processing unit 325, thereby controlling the CCD sensor unit 210. In the process where the CCD sensor unit 210 scans a document image, the document image is read by the color image reading CCD 212 or the monochrome image reading CCD 211. An analog image signal corresponding to each read line is output from an image data communication line 214 or 215 including an image transfer clock signal line, to a CCD control unit 213.

The CCD control unit 213 converts the analog signal into digital image data. The digital image data is transmitted to the image memory unit 329 via an image data information communication line 355 including an image transfer clock signal line, and then transmitted to the controller unit 400 via the image data information communication line 353.

The CPU 321 performs serial communication with the CPU 401 of the controller unit 400 via the control communication line 352, to transmit and receive control data to/from the controller unit 400. The CPU 321 detects an abnormal shape for the document being conveyed, based on the control data from the CPU 401 of the controller unit 400. In detection of an abnormal shape, the CPU 321 calculates, for each document sheet, the difference between the distance from the uppermost surface of the document bundle S measured before conveyance and the distance from the uppermost surface of the document bundle S measured after a predetermined period of time (t2) has elapsed since start of the conveyance. If the difference is equal to or larger than a predetermined value (dl), the CPU 321 determines that the document sheet has an abnormal shape. Then, the CPU 321 notifies the CPU 401 of the controller unit 400 of a result of the determination.

(Controller Unit 400)

The controller unit 400 for image processing is a device that controls the entire image forming apparatus including the ADF function unit 100, the image reading unit 200, and the image forming unit 500. The controller unit 400 includes the CPU 401, an image processing circuit 402, a scanner interface (I/F) 403, an image memory 404, the operation unit 405, a RAM 406 offering a work area, a ROM 407 storing a program, a printer I/F 408, and a hard disk drive (HDD) 409. The RAM 406 indicates a work area including a nonvolatile storage area.

A program may be loaded from the HDD 409 into the RAM 406 and then executed by the CPU 401.

The image data transmitted to the controller unit 400 via the image data information communication line 353 is stored in the image memory 404 via the scanner I/F 403.

The image processing circuit 402 subjects the image in the image memory 404 to image conversion and then the image is stored in the image memory 404 again. The image conversion processing performed by the image processing circuit 402 includes rotation processing for rotating an image in units of 32×32 pixels at a specified angle, and resolution conversion processing for converting the resolution of the image. The image conversion processing performed by the image processing circuit 402 further includes scaling processing for scaling the image, and color space conversion processing for converting a YUV image into a Lab image by subjecting a multivalued input image to matrix operations and a lookup table (LUT). This color space conversion involves 3×8 matrix operations and a one-dimensional LUT to allow performing background removal and show-through prevention.

The controller unit 400 includes a network I/F (not illustrated) and transmits and receives image data and other data to/from an external personal computer (PC).

(Image Forming Unit 500)

The image forming unit 500 conveys recording paper (sheet), prints image data as a visible image on the recording paper, and discharges the paper to the outside of the apparatus. The image forming unit 500 includes a control unit 501 for controlling the image forming unit 500, the paper feed unit 504 having a plurality of types of recording paper cassettes, and a marking unit 503 having the function of transferring and fixing image data onto recording paper. The image forming unit 500 further includes the paper discharge unit 502 having the function of outputting recording paper with an image printed thereon to the outside of the apparatus, and the finisher unit 505 for performing punching and sorting.

When the marking unit 503 has become ready for image forming, the control unit 501 transmits the drawing point signal serving as the reference for the leading edge of document image data to the controller unit 400 via a control communication line 356 as a controller interface.

Then, the marking unit 503 transfers and fixes the image data transmitted via an image communication line 357 as a controller interface, onto recording paper.

The operation unit 405 illustrated in FIG. 3 will be described next with reference to FIG. 4. A liquid crystal display (LCD) touch panel 600 is used to make main mode settings and display a status. A numeric keypad 601 receives numerical inputs from 0 to 9. An ID key 602 is used to input a department ID number and a password number when the apparatus is managed on a department basis.

A Reset key 603 is used to reset the set mode. A guide key 604 is used to display a help screen for each mode. An Interrupt key 606 is used to perform interrupt copying.

A Start key 607 is used to receive an instruction to perform copying or scanning. A Stop key 608 is used to stop the job (copy job or scan job) being executed.

A User Mode key 605 is used to display the user mode screen through which the image forming apparatus receives various settings related to the apparatus.

An Energy Saver key 609 is used to shift the image forming apparatus to an energy saving state. When the image forming apparatus is in the energy saving state, pressing the Energy Saver key 609 again returns the apparatus from the energy saving state.

A Counter Check key 610 is used to display, on the LCD touch panel 600, a count screen for displaying the total number of copies made so far.

A Execution/Memory light emitting diode (LED) 611 indicates that a job is being executed or image data is being stored in the image memory 404. An Error LED 612 indicates that the apparatus is in an error state, such as jamming or door opening. A Main Power LED 613 indicates that the main switch of the apparatus is turned ON.

Figure 5A:
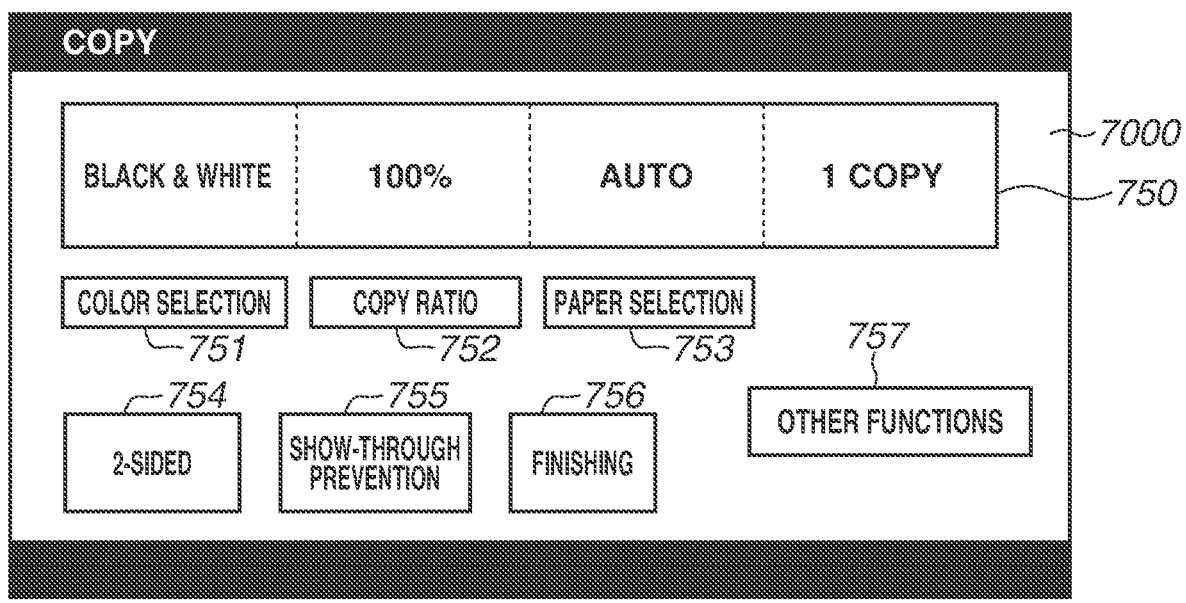
FIGS. 5A to 5D are diagrams each illustrating an example of a screen displayed on a liquid crystal display (LCD) touch panel.

A Copy screen 7000 illustrated in FIG. 5A is displayed on the LCD touch panel 600. Referring to FIG. 5A, buttons for making basic settings including Color Selection 751, Copy Ratio 752, and Paper Selection 753 are arranged on the Copy screen 7000. Setting states of these buttons are displayed in an area 750. Settings other than the basic settings can be selected by selecting an Other Functions button 757. An Other Functions screen 760 illustrated in FIG. 5C allows the user to make settings for functions other than the Color Selection 751, the Copy Ratio 752, and the Paper Selection 753. For functions frequently used by the user among the other functions, shortcut buttons can be generated on the Copy screen 7000. In this example, 2-Sided 754 for setting double-sided printing and Show-Through Prevention 755 for setting show-through prevention for documents are arranged as shortcut buttons. Finishing 756 for setting print output mode and postprocessing is also arranged as a shortcut button.

Figure 5B:
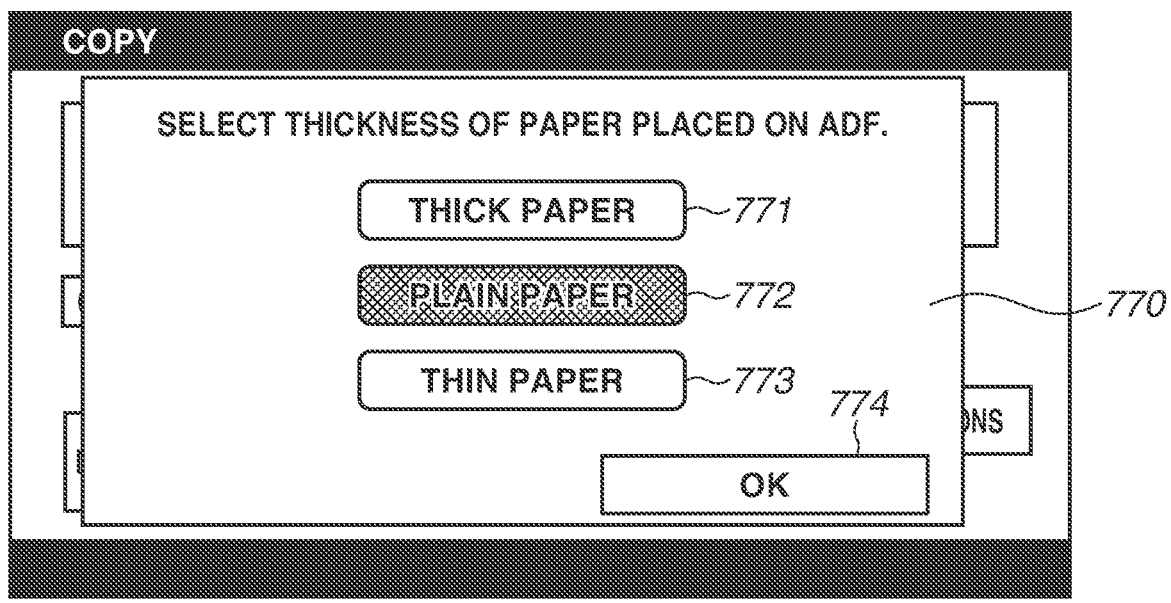

A paper thickness setting screen 770 illustrated in FIG. 5B is an example of a screen for setting the thickness of document paper (paper thickness). For example, the paper thickness setting screen 770 illustrated in FIG. 5B is popped up when the document detection sensor 23 detects a document. The user can also manually display the paper thickness setting screen 770 by selecting a Paper Thickness Setting 763 (refer to FIG. 5C) available from the Other Functions button 757. The paper thickness setting screen 770 allows the user to select Thick Paper 771, Plain Paper 772, or Thin Paper 773. Although, in this example, the Thick Paper 771, the Plain Paper 772, and the Thin Paper 773 are displayed as different buttons, these buttons may be displayed as one record in a list form. A button or a record is an example of an object. When the user selects a paper thickness and selects an OK key 774, the paper thickness is set and then the set paper thickness is stored in the RAM 406.

Figure 5C:
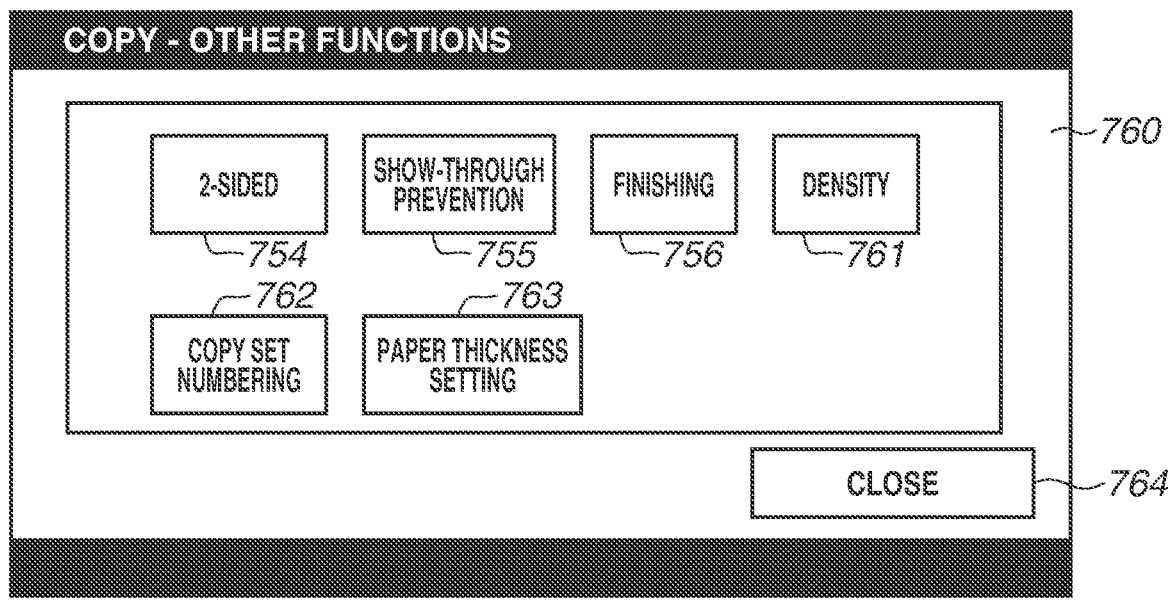

The Other Functions screen 760 illustrated in FIG. 5C is used to set advanced copy functions. The Other Functions screen 760 is displayed when the Other Functions button 757 on the Copy screen 7000 is selected. The Other Functions screen 760 includes Density 761 for setting the print density in addition to the 2-Sided 754, the Show-Through Prevention 755, and the Finishing 756.

The Other Functions screen 760 further includes Copy Set Numbering 762 for setting the printing of copy numbers, and the Paper Thickness Setting 763 for setting the paper thickness of a document. These functions are displayed as buttons.

Figure 5D:
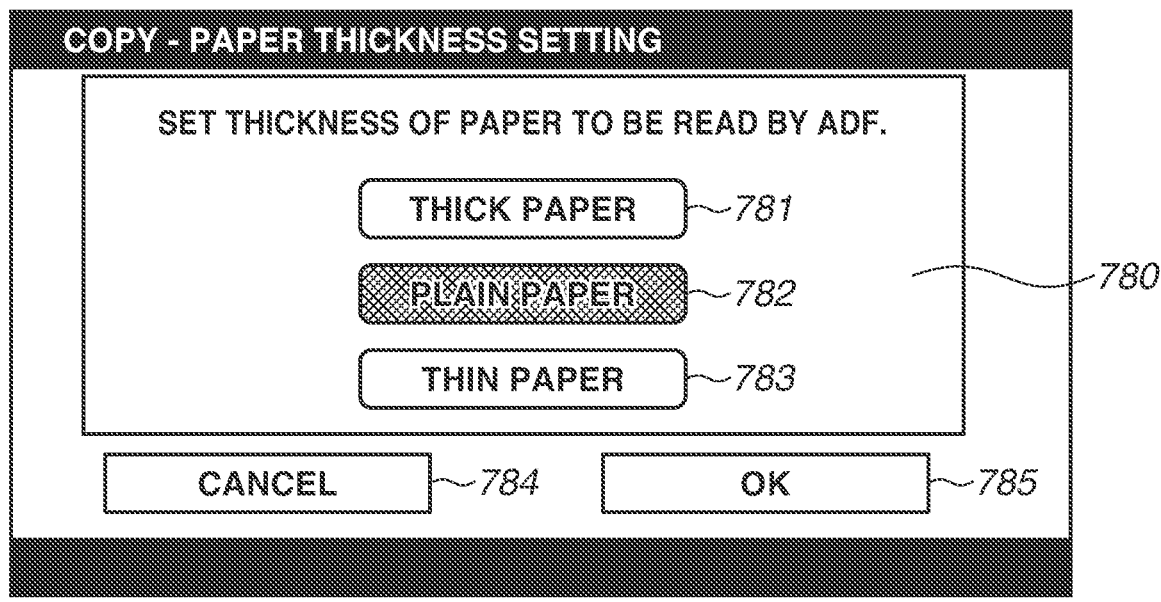

FIG. 5D illustrates an Advanced Paper Thickness Setting screen 780 as an example of a paper thickness setting screen. The Advanced Paper Thickness Setting screen 780 is displayed when the Paper Thickness Setting 763 is selected on the Other Functions screen 760. The Advanced Paper Thickness Setting screen 780 allows the user to select Thick Paper 781, Plain Paper 782, or Thin Paper 783. When the user selects a paper thickness and an OK key 785, the paper thickness is set. The user can cancel the paper thickness setting by selecting a Cancel key 784. Although, in this example, the Thick Paper 781, the Plain Paper 782, and the Thin Paper 783 are displayed as different buttons, these buttons may be displayed as one record in a list form. A button or a record is an example of an object. When the user selects a paper thickness and selects the OK key 785, the paper thickness is set and the set paper thickness is stored in the RAM 406.

Figure 6A:
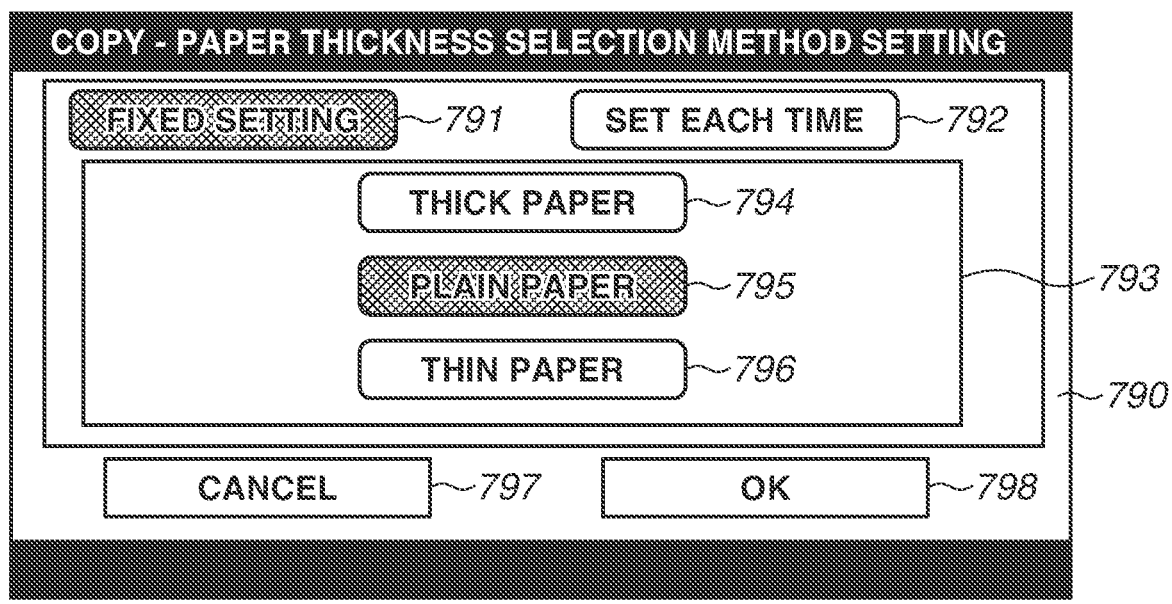
FIGS. 6A to 6C are diagrams each illustrating an example of a paper thickness selection method setting screen displayed on the LCD touch panel.

FIG. 6A illustrates an example of a Paper Thickness Selection Method Setting screen 790. This screen can be displayed when an operation is performed in the user mode. The user mode screen is displayed when the user selects the User Mode key 605 of the operation unit 405. Although not illustrated, the user mode is also provided with other functions allowing the user to make various settings in the image forming apparatus.

The Paper Thickness Selection Method Setting screen 790 includes a Fixed Setting button 791 and a Set Each Time button 792 for setting the paper thickness selection method. The Set Each Time button 792 is used to enable the function of automatically displaying the paper thickness setting screen 770 in response to detecting that a document is placed on the document tray 30. The Fixed Setting button 791 is used to disable the function of automatically displaying the paper thickness setting screen 770 in response to detecting that a document is placed on the document tray 30. By selecting either the Fixed Setting button 791 or the Set Each Time button 792, the user can set the paper thickness selection method. When the Fixed Setting button 791 is selected, the Thick Paper 794, the Plain Paper 795, and the Thin Paper 796 are displayed in a fixed paper thickness setting area 793 to allow the user to set the paper thickness. In the fixed paper thickness setting area 793, the user can select the Thick Paper 794, the Plain Paper 795, or the Thin Paper 796. When an OK key 798 is selected in a state where one of the Thick Paper 794, the Plain Paper 795, and the Thin Paper 796 is selected, "Fixed Setting" is set as the paper thickness selection method and the selected paper is set as the paper thickness, and then these settings are stored in the RAM 406.

Figure 6B:
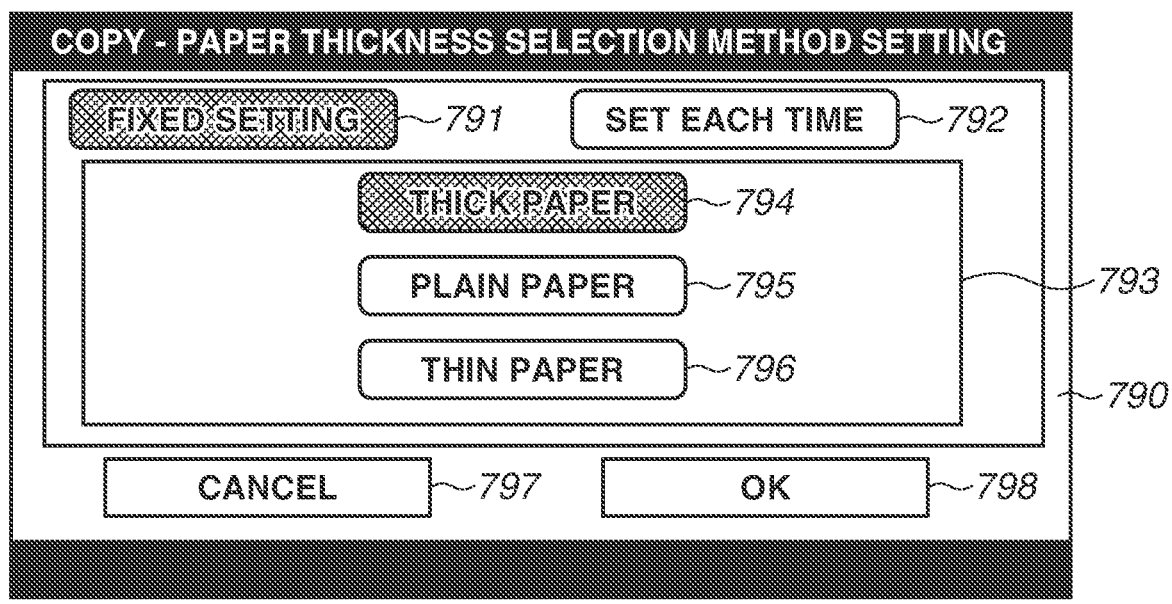

A specific example will be described next with reference to FIG. 6B. FIG. 6B illustrates an example of a screen displayed when "Fixed Setting" is selected as the paper thickness selection method and "Thick Paper" is selected as the fixed paper thickness setting. More specifically, FIG. 6B illustrates a state where the Fixed Setting button 791 is selected as the paper thickness selection method and the Thick Paper 794 is selected. When the OK key 798 is selected in this state, "Fixed Setting" is set as Paper Thickness Selection Method 701 illustrated in FIG. 7, and "Thick Paper" is set as Fixed Paper Thickness Setting 702 illustrated in FIG. 7 (described below). When "Fixed Setting" is selected, the paper thickness setting screen 770 is not to be displayed, and the paper thickness is constantly and automatically set based on the paper thickness set in FIG. 6A or 6B.

When a Cancel key 797 is selected, the paper thickness selection method setting and the paper thickness setting are canceled.

Figure 6C:
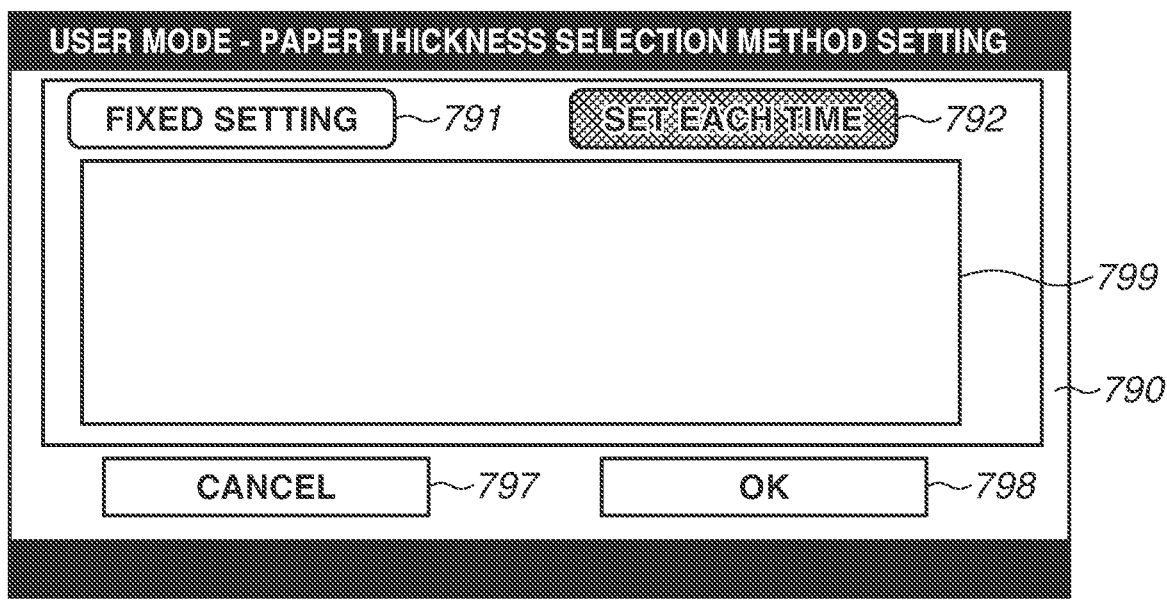

FIG. 6C illustrates an example of a screen displayed when the Set Each Time button 792 is selected as the paper thickness selection method. When the Set Each Time button 792 is selected as the paper thickness selection method, no setting button is displayed in a fixed paper thickness setting area 799. When the OK key 798 is selected in this state, "Set Each Time" is set as the Paper Thickness Selection Method 701 illustrated in FIG. 7.

FIG. 7 illustrates an example of setting values stored in the RAM 406. An Apparatus Settings area 700 stores setting values to be shared across the entire apparatus. The Apparatus Settings area 700 includes the Paper Thickness Selection Method 701, the Fixed Paper Thickness Setting 702, and Specified Paper Thickness Setting 703. The Apparatus Settings area 700 may store other apparatus settings.

The Specified Paper Thickness Setting 703 will be described next. When "Fixed Setting" is selected as the Paper Thickness Selection Method 701, the setting value specified by the user as the fixed setting is stored as the Fixed Paper Thickness Setting 702. On the other hand, the Specified Paper Thickness Setting 703 is the setting value to be referred to at the time of conveying a document. More specifically, when "Set Each Time" is selected as the Paper Thickness Selection Method 701, the setting value to be specified each time by the user is stored as the Specified Paper Thickness Setting 703. When "Fixed Setting" is selected as the Paper Thickness Selection Method 701, the same setting value as the Fixed Paper Thickness Setting 702 is stored as the Specified Paper Thickness Setting 703. However, when a specific function such as an accessibility function (described below) is being performed, a setting value different from the Fixed Paper Thickness Setting 702 is stored as the Specified Paper Thickness Setting 703 even when "Fixed Setting" is selected as the Paper Thickness Selection Method 701. More specifically, the setting value to be stored as the Specified Paper Thickness Setting 703 depends on the function being performed and the settings by the user. If no document is placed on the ADF 1000, the setting value for specifying the paper thickness is not stored as the Specified Paper Thickness Setting 703. If a document is placed on the ADF 1000, a certain setting value for specifying the paper thickness is stored as the Specified Paper Thickness Setting 703.

A Copy Settings area 710 stores setting values to be used for the copy function. The Copy Settings area 710 includes, for example, Paper Thickness Setting 711, Page Printing 712, N-in-one Printing 713, Bookbinding 714, and Number of Copies 715. These setting items are examples, and other copy settings may be stored.

The Copy Settings area 710 may include an area for storing setting values related to functions other than the copy function such as a data transmission function.

Based on these settings, the image forming apparatus according to the present exemplary embodiment controls execution of a print job.

(Flowchart for Setting Paper Thickness Selection Method from User Mode)

Figure 8:
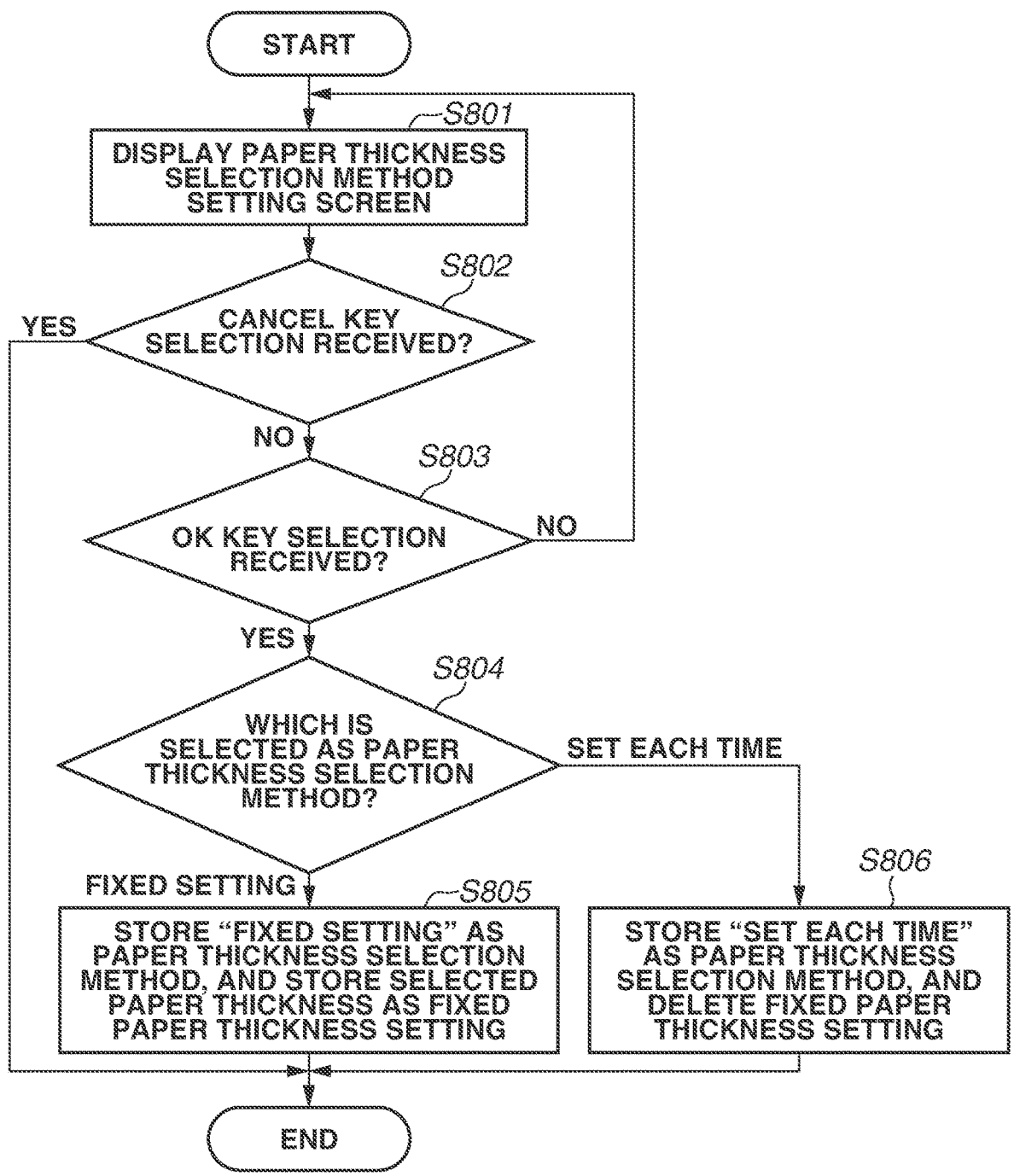
FIG. 8 is a flowchart illustrating processing for setting a paper thickness selection method.

A flowchart for setting the paper thickness selection method from the user mode will be described next with reference to FIG. 8.

This flowchart is started when the User Mode key 605 of the operation unit 405 is selected, the user mode screen is displayed, and a paper thickness selection method setting is selected from the user mode. The flowchart is implemented when the CPU 401 of the controller unit 400 loads a control program from the ROM 407 into the RAM 406 and then executes the control program.

In step S801, the CPU 401 displays, on the LCD touch panel 600, the Paper Thickness Selection Method Setting screen 790 illustrated in FIG. 6A. The LCD touch panel 600 receives, on the Paper Thickness Selection Method Setting screen 790, the selection of the Fixed Setting button 791 or the Set Each Time button 792, or the selection of the Thick Paper 794, the Plain Paper 795, or the Thin Paper 796 displayed in the fixed paper thickness setting area 793. The CPU 401 stores the received selection(s) in the RAM 406.

In step S802, the CPU 401 determines whether the selection of the Cancel key 797 is received. When the selection of the Cancel key 797 is received (YES in step S802), the CPU 401 does not reflect the selected state on the Paper Thickness Selection Method Setting screen 790 in the Apparatus Settings area 700. Then, the processing ends. When the selection of the Cancel key 797 is not received (NO in step S802), the processing proceeds to step S803.

In step S803, the CPU 401 determines whether the selection of the OK key 798 is received.

When the selection of the OK key is received (YES in step S803), the processing proceeds to step S804. When the selection of the OK key is not received (NO in step S803), the processing returns to step S801.

In step S804, the CPU 401 determines which of the Fixed Setting button 791 and the Set Each Time button 792 is selected as the paper thickness selection method. When the Fixed Setting button 791 is selected (FIXED SETTING in step S804), the processing proceeds to step S805. When the Set Each Time button 792 is selected (SET EACH TIME in step S804), the processing proceeds to step S806.

In step S805, the CPU 401 stores "Fixed Setting" as the Paper Thickness Selection Method 701 in the Apparatus Settings area 700. Then, the CPU 401 stores the paper thickness selected from the Thick Paper 794, the Plain Paper 795, and the Thin Paper 796 displayed in the fixed paper thickness setting area 793, as the Fixed Paper Thickness Setting 702. Then, the processing ends.

In step S806, the CPU 401 stores "Set Each Time" as the Paper Thickness Selection Method 701 in the Apparatus Settings area 700. Then, the processing ends.

Figure 9:
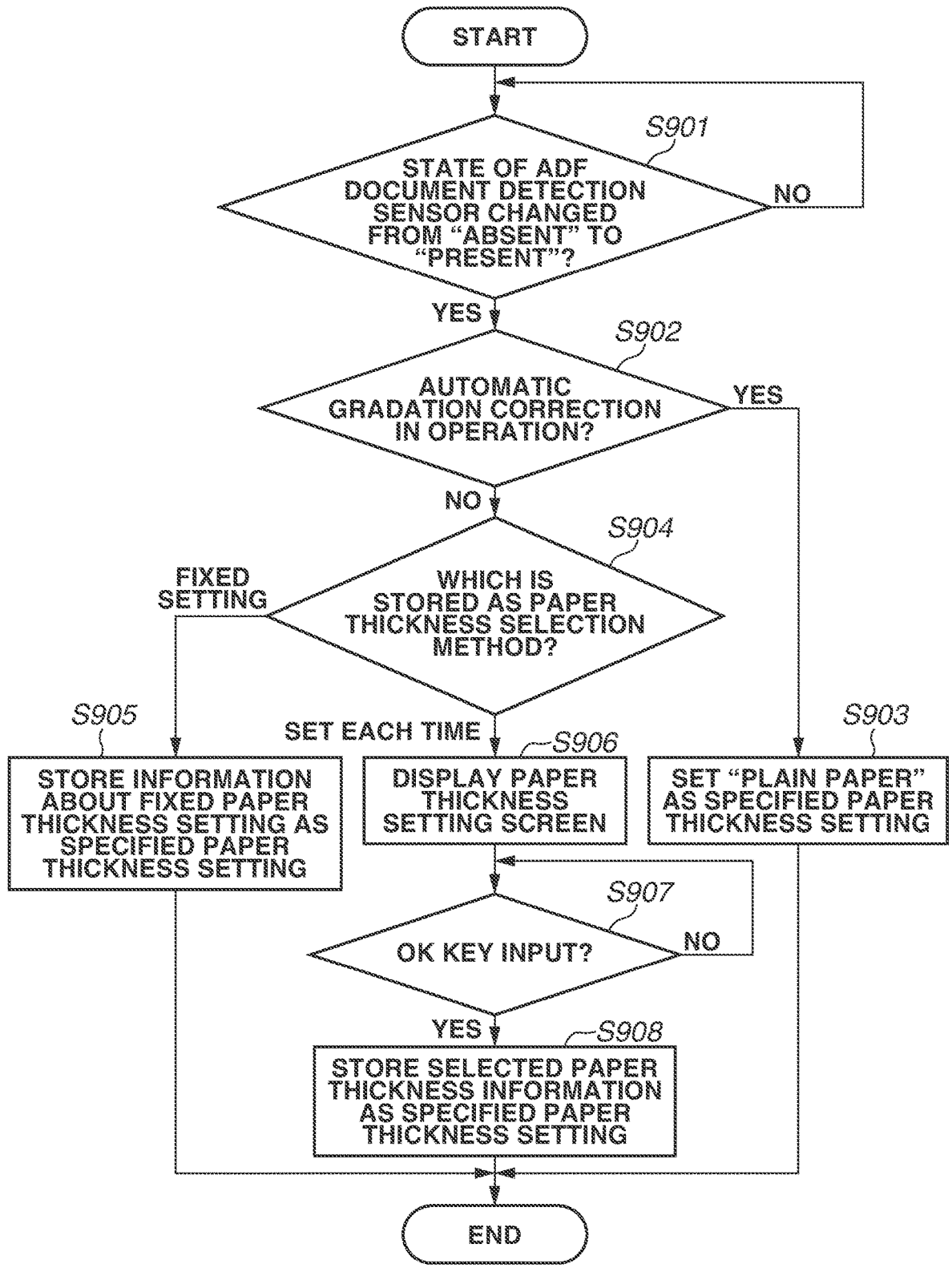
FIG. 9 is a flowchart illustrating processing for setting a paper thickness.

Next, processing performed based on the Paper Thickness Selection Method 701 in the Apparatus Settings area 700 when a document is placed on the ADF 1000, according to the present exemplary embodiment, will be described in detail with reference to the flowchart illustrated in FIG. 9.

This flowchart is started from a state where the Copy screen 7000 is displayed on the LCD touch panel 600. The series of processing is implemented when the CPU 401 of the controller unit 400 loads a control program from the ROM 407 into the RAM 406 and then executes the control program.

In step S901, the CPU 401 determines whether the detection state of the document detection sensor 23 of the ADF 1000 has changed. When the CPU 401 determines that the detection state of the document detection sensor 23 has changed from "Absent" to "Present" (YES in step S901), the processing proceeds to step S902.

In step S902, the CPU 401 determines whether the automatic gradation correction function is in operation. When the automatic gradation correction function is in operation (YES in step S902), the processing proceeds to step S903. In step S903, the CPU 401 sets "Plain Paper" as the Specified Paper Thickness Setting 703 in the Apparatus Settings area 700 of the RAM 406.

When the automatic gradation correction function is not in operation (NO in step S902), the processing proceeds to step S904. In step S904, the CPU 401 determines which of "Set Each Time" and "Fixed Setting" is stored as the Paper Thickness Selection Method 701 in the RAM 406. When "Fixed Setting" is stored (FIXED SETTING in step S904), the processing proceeds to step S905. In step S905, the CPU 401 reads information about the Fixed Paper Thickness Setting 702 stored in the RAM 406 and then stores the information as the Specified Paper Thickness Setting 703. In the present exemplary embodiment, since "Thick Paper" is set as the Fixed Paper Thickness Setting 702, "Thick Paper" is set as the Specified Paper Thickness Setting 703.

When "Set Each Time" is stored as the Paper Thickness Selection Method 701 (SET EACH TIME in step S904), the processing proceeds to step S906. In step S906, the CPU 401 overlaps the paper thickness setting screen 770 illustrated in FIG. 5B on the current screen on the LCD touch panel 600, and receives the selection of a paper thickness.

In step S907, the CPU 401 determines whether the selection of the OK key 774 is received.

When the selection of the OK key 774 is received (YES in step S907), the processing proceeds to step S908.

In step S908, the CPU 401 stores information about the currently selected paper thickness (Thick Paper 771, Plain Paper 772, or Thin Paper 773) as the Specified Paper Thickness Setting 703 in the Apparatus Settings area 700 of the RAM 406.

Next, read processing in the automatic gradation correction function will be described. The automatic gradation correction function is started when the User Mode key 605 of the operation unit 405 is selected, the user mode screen is displayed, and then the automatic gradation correction function is selected from the user mode.

This processing is implemented when the CPU 401 of the controller unit 400 loads a control program from the ROM 407 into the RAM 406 and then executes the control program.

Figure 10:
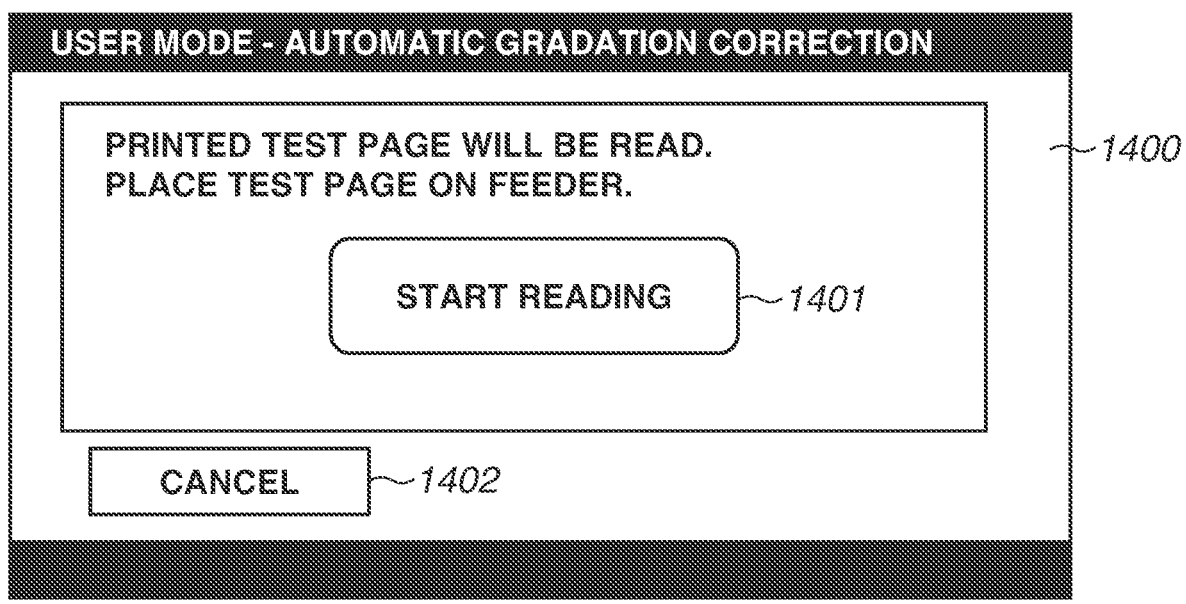
FIG. 10 is a diagram illustrating an example of a screen displayed on the LCD touch panel.
Figure 11:
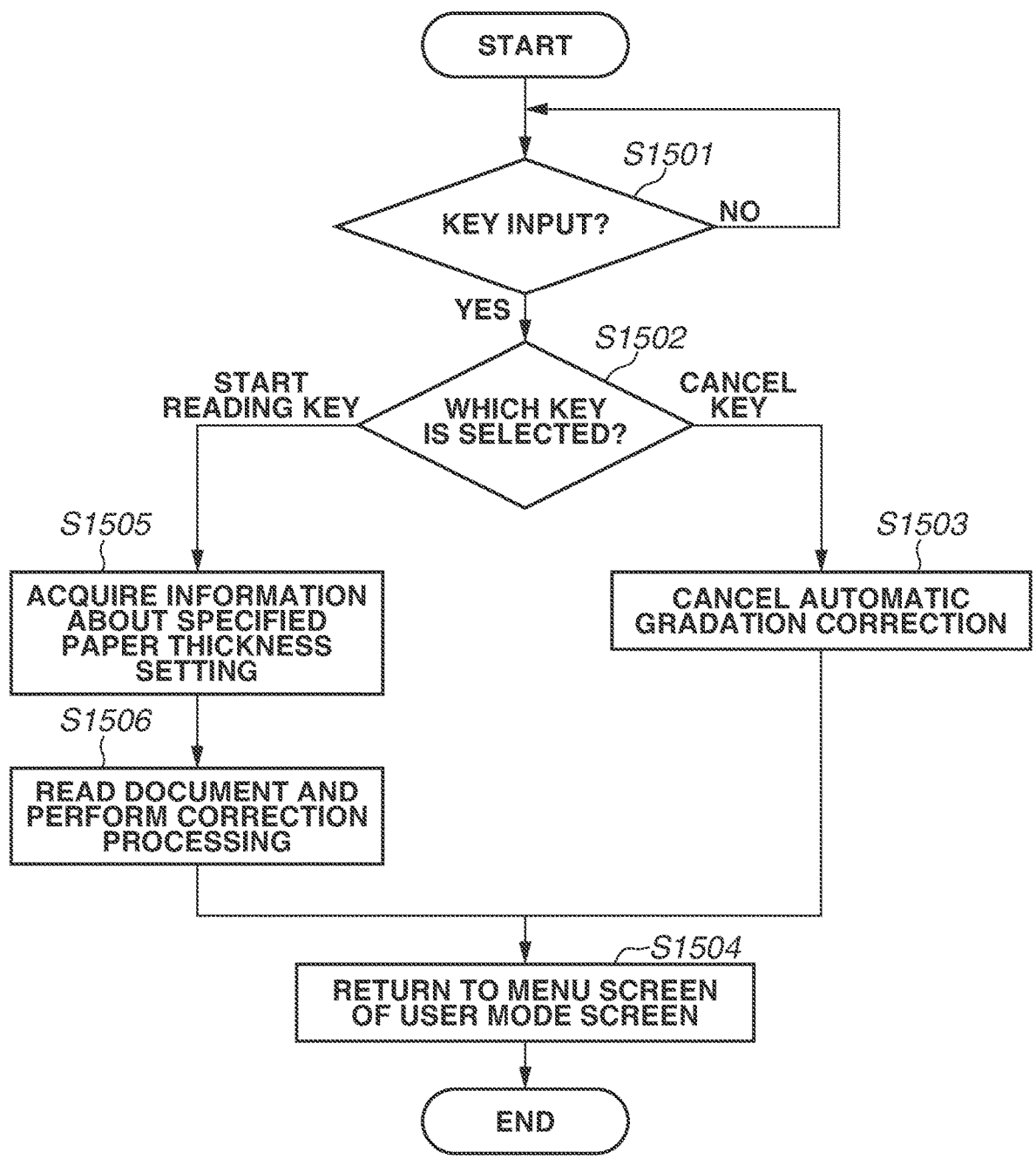
FIG. 11 is a flowchart illustrating processing for performing automatic gradation correction.

After a printed test page is output on a test page output screen (not illustrated) for the automatic gradation correction, the CPU 401 displays a screen 1400 (refer to FIG. 10) for starting reading the test page, on the LCD touch panel 600. FIG. 10 illustrates an example of the screen 1400 for starting reading the test page, which is displayed on the LCD touch panel 600. A Start Reading key 1401 is used to start reading the test page. When the CPU 401 determines that the document detection sensor 23 of the ADF 1000 does not detect that a document is "Present", the Start Reading key 1401 is shaded and disabled. The Cancel key 1402 is used to cancel the automatic gradation correction. Next, processing performed when the document detection sensor 23 of the ADF 1000 detects that a document is "Present" and the Start Reading key 1401 is selected will be described with reference to the flowchart illustrated in FIG. 11. The processing illustrated in FIG. 11 is started when a user operation is received in a state where the screen 1400 is displayed.

In step S1501, the CPU 401 determines whether a key is input. When a key is input (YES in step S1501), the processing proceeds to step S1502. In step S1502, the CPU 401 determines which key is selected. When the Cancel key 1402 is selected (CANCEL KEY in step S1502), the processing proceeds to step S1503. In step S1503, the CPU 401 performs processing for canceling the automatic gradation correction. When the cancel processing is completed, then in step S1504, the CPU 401 returns the screen to the menu screen (not illustrated) of the user mode screen.

When the Start Reading key 1401 is selected (START READING KEY in step S1502), the processing proceeds to step S1505. In step S1505, the CPU 401 reads the paper thickness information stored as the Specified Paper Thickness Setting 703 in the Apparatus Settings area 700 of the RAM 406. In the present exemplary embodiment, since "Plain Paper" is specified as the Specified Paper Thickness Setting 703, the CPU 401 instructs the CPU 300 of the ADF function unit 100 to set the document conveyance speed to a constant speed, and controls the ADF function unit 100 to start feeding a document sheet. In step S1506, the CPU 321 instructs the image reading unit 200 to read image data. The read image data is transmitted to the controller unit 400 via the image data information communication line 353 and then is subjected to image gradation, density, and tint adjustments. When the adjustments have been completed, then in step S1504, the CPU 401 returns the screen to the menu screen (not illustrated) of the user mode screen.

Figure 12:
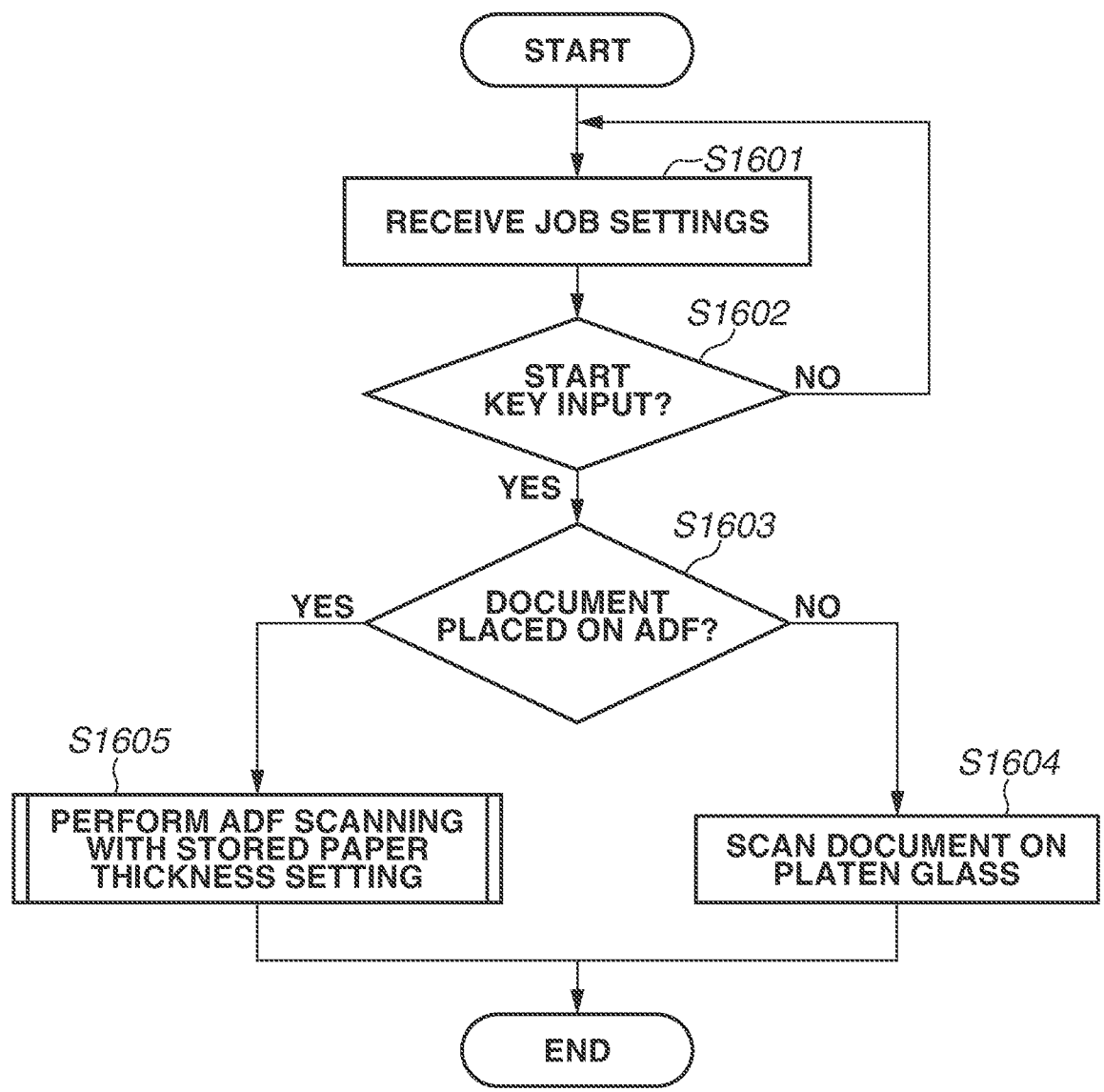
FIG. 12 is a flowchart illustrating processing for setting a job.

Next, read processing in the copy function will be described with reference to FIG. 12. In step S1601, the CPU 401 displays the Copy screen 7000 illustrated in FIG. 5A on the LCD touch panel 600, and then receives copy settings from the user. When a change is made to the copy settings on the Copy screen 7000 or the Other Functions screen 760, the CPU 401 stores the changed setting in the corresponding setting item in the Copy Settings area 710 of the RAM 406. When displaying the Other Functions screen 760, the CPU 401 performs processing for switching the functions to be displayed, depending on the setting of the Paper Thickness Selection Method 701 in the Apparatus Settings area 700. This processing will be described in detail below with reference to FIG. 13.

In step S1602, the CPU 401 determines whether the selection of the Start key 607 of the operation unit 405 is received. When the selection of the Start key 607 is received (YES in step S1602), the processing proceeds to step S1603.

In step S1603, the CPU 401 determines whether a document is placed on the document tray 30 of the ADF 1000, based on the signal from the document detection sensor 23. When the CPU 401 determines that no document is placed (NO in step S1603), the processing proceeds to step S1604.

In step S1604, the CPU 401 instructs the image reading unit 200 to scan the document placed on the platen glass 202. In response to the instruction, the image reading unit 200 scans the document placed on the platen glass 202. In this case, since the document is not conveyed and thus the scanning is not influenced by the conveyance speed, the Paper Thickness Setting 711 stored in the RAM 406 is not used.

When the CPU 401 determines that a document is placed on the document tray 30 (YES in step S1603), the processing proceeds to step S1605. In step S1605, the CPU 401 controls the ADF 1000 to perform scanning based on the Paper Thickness Setting 711 in the Copy Settings area 710 stored in the RAM 406. The processing in step S1605 will be described in detail below with reference to FIG. 15.

When the scanning is completed, image data generated based on the scanned document image is transmitted to the image forming unit 500 via the printer I/F 408, so that printing is performed. When the printing is completed, the CPU 401 initializes the Copy Settings area 710 including the Paper Thickness Setting 711 stored in the RAM 406. Then, the processing ends. While the copying has been described as an example of a function that performs scanning, the processing may be applied to mail transmission, Group 3 (G3) facsimile transmission, and other functions. In mail transmission, when the scanning is completed, image data generated based on the scanned document image is transmitted to a specified destination via a network I/F (not illustrated).

Figure 13:
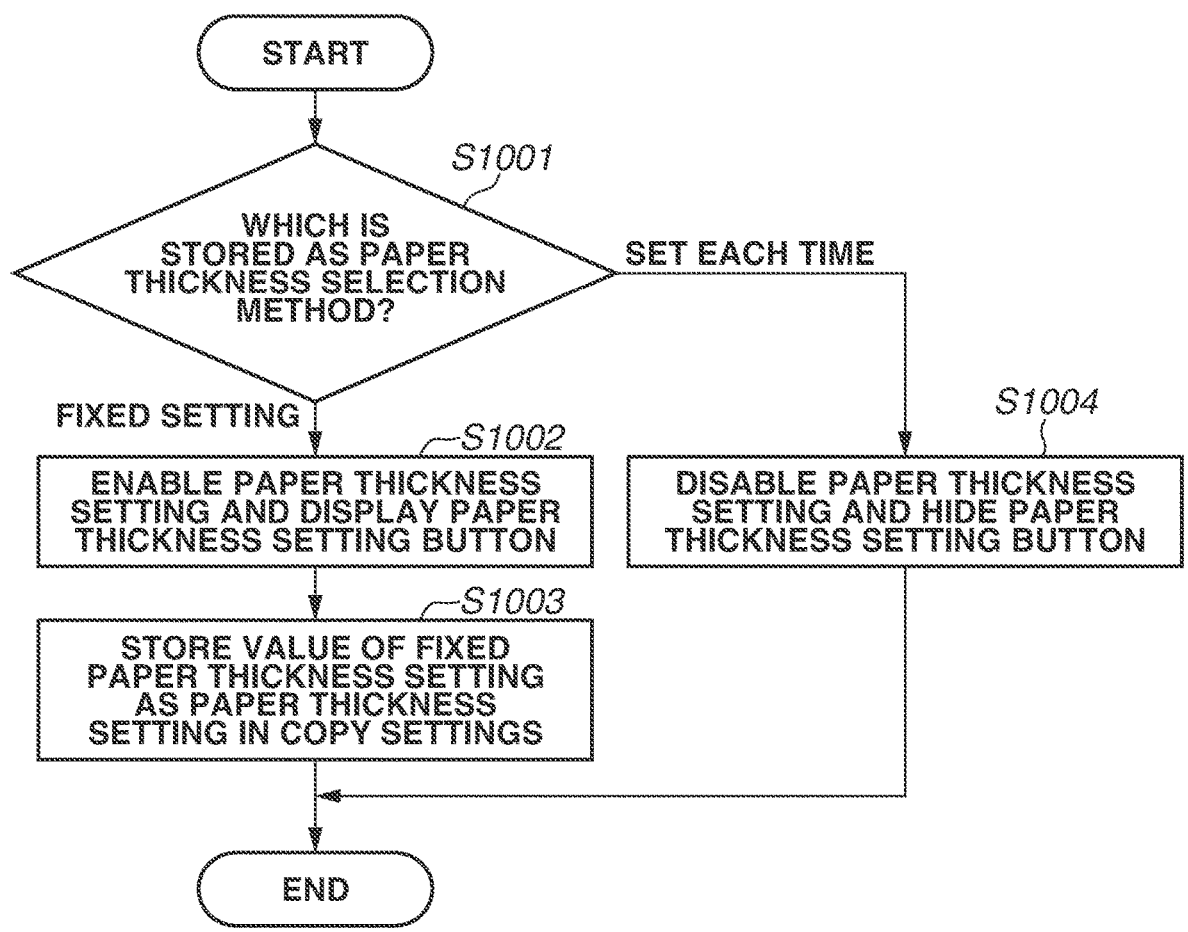
FIG. 13 is another flowchart illustrating processing for setting a job.

A detailed flowchart of processing for enabling and disabling the Paper Thickness Setting 763 when the Other Functions screen 760 is selected in step S1601 according to the present exemplary embodiment will be described next with reference to FIG. 13. This flowchart is started when an instruction to display the Other Functions screen 760 is issued. The series of processing is implemented when the CPU 401 of the controller unit 400 loads a control program from the ROM 407 into the RAM 406 and then executes the control program.

In step S1001, the CPU 401 reads the setting value stored as the Paper Thickness Selection Method 701 in the Apparatus Settings area 700. When "Fixed Setting" is stored (FIXED SETTING in step S1001), the processing proceeds to step S1002. When "Set Each Time" is stored (SET EACH TIME in step S1001), the processing proceeds to step S1004.

In step S1002, the CPU 401 determines that the Paper Thickness Setting 711 in the Copy Settings area 710 is valid, and displays, on the LCD touch panel 600, the Other Functions screen 760 in which the Paper Thickness Setting 763 illustrated in FIG. 5C is displayed.

In step S1003, the CPU 401 reads the setting value stored as the Fixed Paper Thickness Setting 702 in the Apparatus Settings area 700, and then stores the read value as the Paper Thickness Setting 711 in the Copy Settings area 710. Then, the processing ends.

In step S1004, the CPU 401 determines that the Paper Thickness Setting 711 in the Copy Settings area 710 is invalid, and displays, on the LCD touch panel 600, an Other Functions screen 765 in which the Paper Thickness Setting 763 (described below with reference to FIG. 14) is not displayed. Then, the processing ends.

Figure 14:
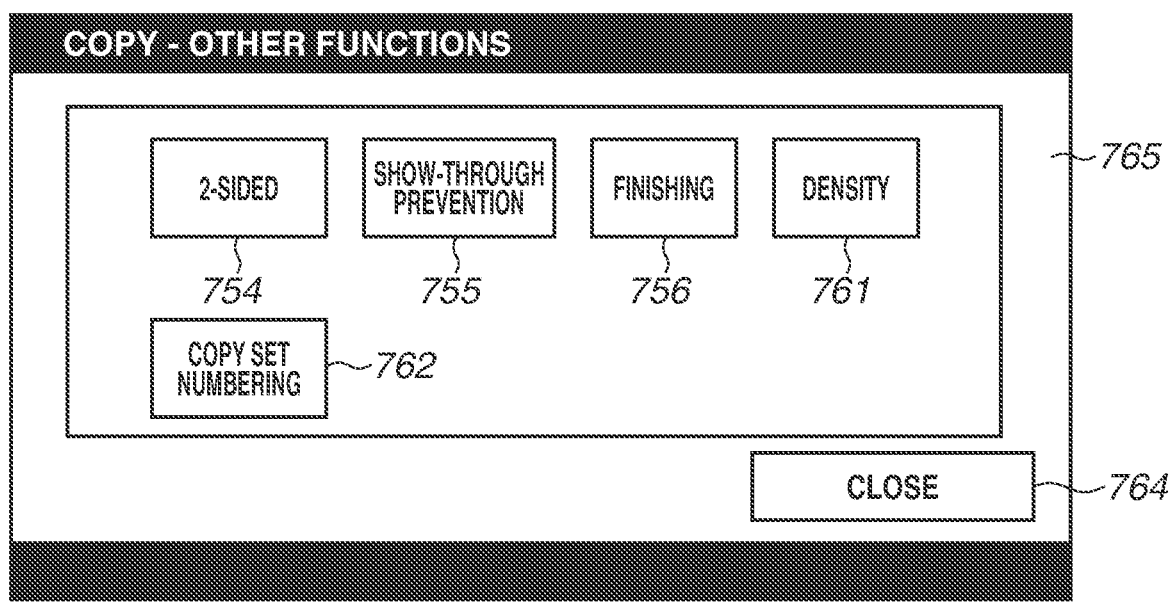
FIG. 14 is a diagram illustrating an example of a screen displayed when a paper thickness setting is disabled.

FIG. 14 illustrates an example of the Other Functions screen 765 that is displayed in a case where "Set Each Time" is stored as the Paper Thickness Selection Method 701. The Other Functions screen 765 is displayed when the Other Functions button 757 is selected on the Copy screen 7000, similarly to the Other Functions screen 760 illustrated in FIG. 5C. When "Set Each Time" is stored as the Paper Thickness Selection Method 701, a paper thickness is to be set for each copy job and thus the user does not perform the paper thickness setting. Accordingly, the Paper Thickness Setting 763 for setting the document paper thickness is not displayed. On the other hand, since other functions may be used, the other function buttons are displayed.

Figure 15:
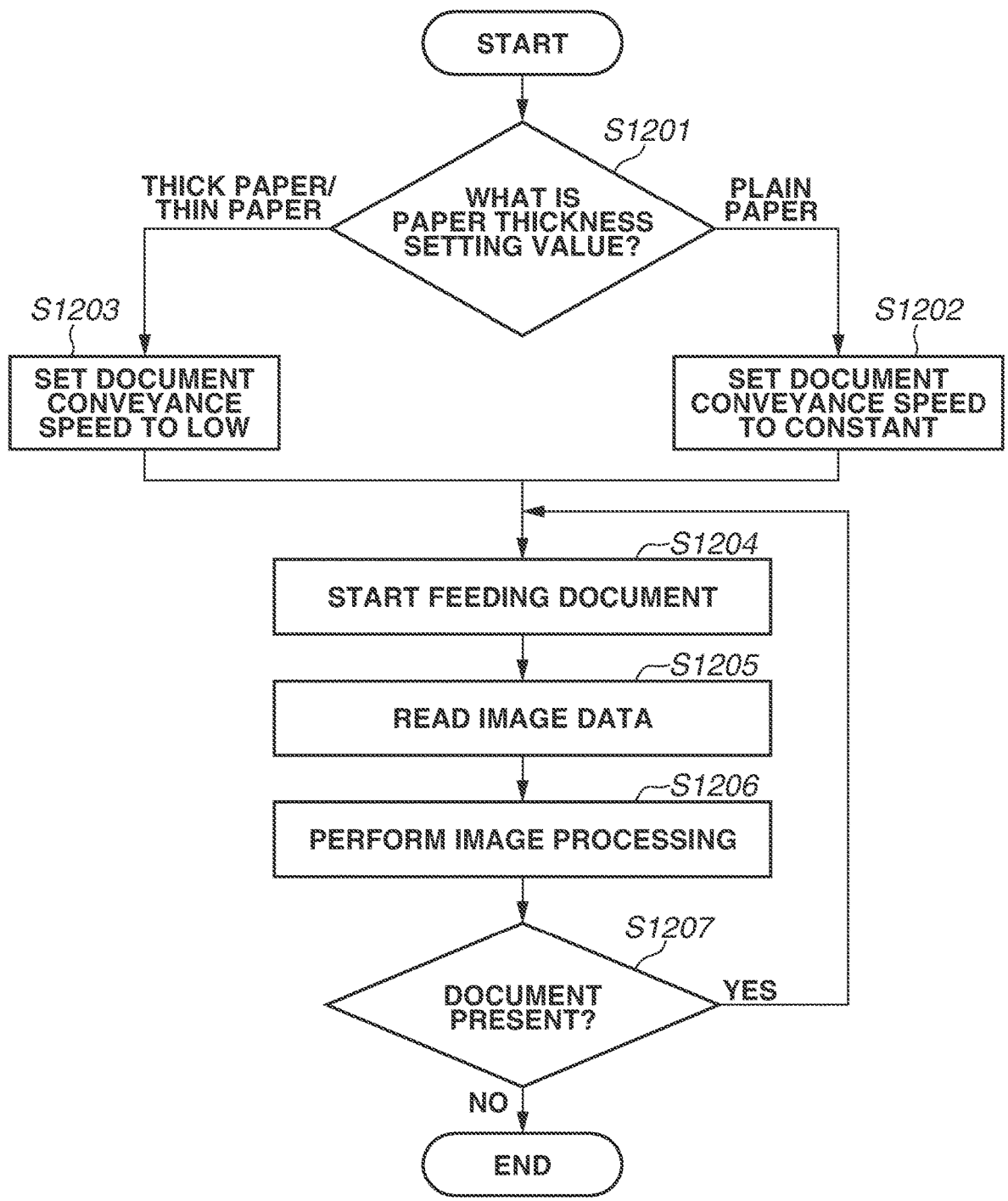
FIG. 15 is a flowchart illustrating processing for performing scanning.

Next, the scan processing of the ADF 1000 in step S1605 (in FIG. 12) according to the present exemplary embodiment will be described with reference to the flowchart illustrated in FIG. 15. The processing illustrated in FIG. 15 is implemented when the CPU 321 of the image reading unit 200 loads a control program from the ROM 322 into the RAM 323 and then executes the control program, in response to a scan execution instruction from the CPU 401.

In response to an instruction from the CPU 401 of the controller unit 400 to start reading the document, then in step S1201, the CPU 321 determines the value of the Paper Thickness Setting 711 in the Copy Settings area 710. When the determined paper thickness is Plain Paper (predetermined thickness) (PLAIN PAPER in step S1201), the processing proceeds to step S1202. In step S1202, the CPU 321 instructs the CPU 300 of the ADF function unit 100 to set the document conveyance speed to a constant speed. In response to the instruction to set the document conveyance speed to a constant speed, the CPU 300 controls the document conveyance speed of the motor 303 for driving the conveyance roller 3, the registration roller 4, the conveyance rollers 5 and 6, the large roller 7, and the discharge roller 8 to the normal conveyance speed.

When the paper thickness determined in step S1201 is Thick Paper (thicker than the predetermined thickness) or Thin Paper (thinner than the predetermined thickness) (THICK PAPER/THIN PAPER in step S1201), the processing proceeds to step S1203. In step S1203, the CPU 321 instructs the CPU 300 of the ADF function unit 100 to set the document conveyance speed to a low speed.

In response to the instruction to set the document conveyance speed to a low speed, the CPU 300 reduces the rotational speed of the motor 303 for driving the conveyance roller 3, the registration roller 4, the conveyance rollers 5 and 6, the large roller 7, and the discharge roller 8, to control the document conveyance speed to be lower than the normal conveyance speed. For example, the CPU 300 controls the document conveyance speed to be half of the normal conveyance speed. As a result, in the case of a thick paper document, insufficient torque can be solved at a curved portion of the conveyance path, thereby preventing the thick paper document from being jammed at a curved portion of the conveyance path. In the case of a thin paper document, after the thin paper document has been discharged and dropped completely, the next document is to be discharged. This makes it possible to improve the stacking performance of the paper discharge unit 502, thereby preventing a thin paper document from being jammed at or near the paper discharge unit 502.

After the document conveyance speed is set, the processing proceeds to step S1204. In step S1204, the CPU 321 starts feeding a document.

In step S1205, the CPU 321 controls the image reading unit 200 to read image data. Then, the processing proceeds to step S1206. The read image data is transmitted to the controller unit 400 via the image data information communication line 353 and then stored in the image memory 404 via the scanner I/F 403.

In step S1206, the CPU 401 performs image processing on the image data stored in the image memory 404. In step S1207, the CPU 321 determines whether a document is present on the document tray 30. When a document is placed on the document tray 30 (YES in step S1207), the processing returns to step S1204. When no document is placed on the document tray 30 (NO in step S1207), the processing ends.

According to the present exemplary embodiment, even when a setting has been made to, each time a document is placed on the document tray 30 of the ADF 1000, display a screen for setting the thickness of the document, the screen is not to be displayed if a function that operates at a predetermined conveyance speed is being performed. This can prevent the number of user operations from increasing.

The information indicating the thickness of the document that is set by the user via the paper thickness setting screen 770 in FIG. 5B or the Advanced Paper Thickness Setting screen 780 in FIG. 5D according to the present exemplary embodiment is deleted when the user selects the Reset key 603. In addition, the information is deleted when printing or transmission of a scanned image is completed, and thus cannot be used in the next job. In other words, the information is deleted at the completion of a job. This aims to prevent the thickness of the document set by the user via the paper thickness setting screen 770 in FIG. 5B or the Advanced Paper Thickness Setting screen 780 in FIG. 5D from being unintentionally transferred to and used in the next job with another document. On the other hand, the information indicating the thickness of the document set via the fixed paper thickness setting area 793 in FIG. 6A is not deleted even after printing or transmission of a scanned image is completed.

In the present exemplary embodiment, the example has been described in which, when the Fixed Setting button 791 is selected, the user is prompted to select a paper thickness from the Thick Paper 794, the Plain Paper 795, and the Thin Paper 796. Alternatively, when the Fixed Setting button 791 is selected, the factory default value may be stored as the Fixed Paper Thickness Setting 702 and used. For example, the Plain Paper 795 that is likely to be used frequently may be stored as the default value.

Figure 16:
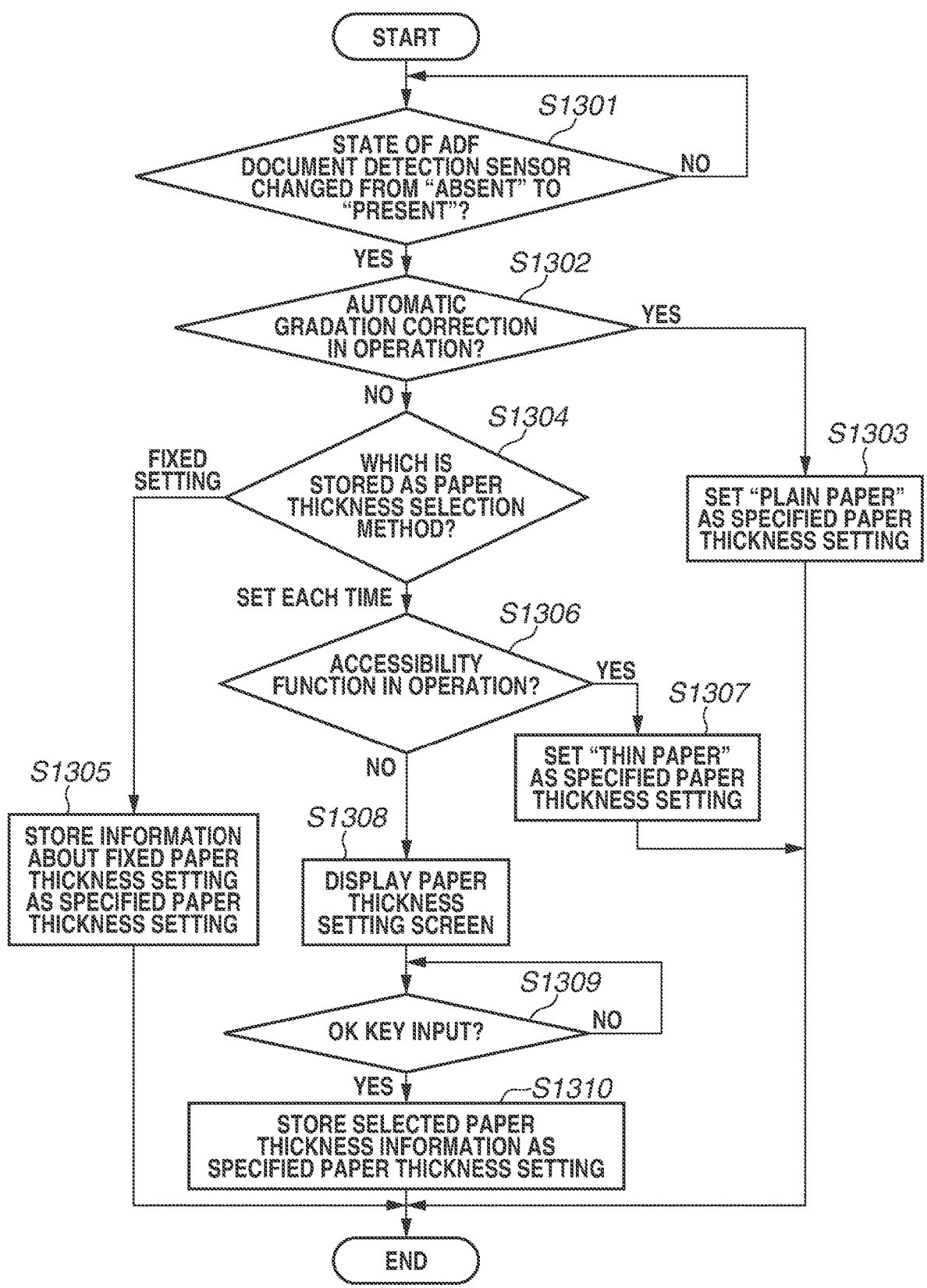
FIG. 16 is another flowchart illustrating processing for setting a paper thickness.

In a second exemplary embodiment, a case will be described where it is assumed to be difficult for the user to determine the type of paper. As examples of functions for users with poor eyesight or users with handicapped fingers, a screen color inversion function, a voice guidance function, and a voice operation function are offered (hereinafter these functions are referred to as accessibility functions). The Paper Thickness Selection Method 701 in the Apparatus Settings area 700 considering the accessibility functions will be described next with reference to the flowchart illustrated in FIG. 16.

In step S1301, the CPU 401 determines whether the detection state of the document detection sensor 23 of the ADF 1000 has changed. When the CPU 401 determines that the detection state has changed from "Absent" to "Present" (YES in step S1301), the processing proceeds to step S1302.

In step S1302, the CPU 401 determines whether the automatic gradation correction function is in operation. When the automatic gradation correction function is in operation (YES in step S1302), the processing proceeds to step S1303. In step S1303, the CPU 401 sets "Plain Paper" as the Specified Paper Thickness Setting 703 in the Apparatus Settings area 700 of the RAM 406.

When the CPU 401 determines that the automatic gradation correction function is not in operation (NO in step S1302), the processing proceeds to step S1304. In step S1304, the CPU 401 determines which of "Set Each Time" and "Fixed Setting" is stored as the Paper Thickness Selection Method 701 in the RAM 406. When "Fixed Setting" is stored (FIXED SETTING in S1304), the processing proceeds to step S1305. In step S1305, the CPU 401 reads the information about the Fixed Paper Thickness Setting 702 stored in the RAM 406 and then stores the information as the Specified Paper Thickness Setting 703. In the present exemplary embodiment, since "Thick Paper" is set as the Fixed Paper Thickness Setting 702, "Thick Paper" is set as the Specified Paper Thickness Setting 703.

When "Set Each Time" is stored as the Paper Thickness Selection Method 701 (SET EACH TIME in step S1304), the processing proceeds to step S1306. In step S1306, the CPU 401 determines whether any accessibility function is in operation. When the CPU 401 determines that an accessibility function is in operation (YES in step S1306), the processing proceeds to step S1307. In step S1307, the CPU 401 sets "Thin Paper" as the Specified Paper Thickness Setting 703 in the Apparatus Settings area 700 of the RAM 406. Because this aims to set the document reading speed to a low speed, "Thick Paper" may be set as the Specified Paper Thickness Setting 703. Although the document reading speed is lowered based on the Specified Paper Thickness Setting 703, any paper thickness, i.e., any of thin paper, plain paper, and thick paper can be supported by setting the document reading speed to a low speed. On the other hand, when no accessibility function is in operation (NO in step S1306), the processing proceeds to step S1308. When "Set Each Time" is stored as the Paper Thickness Selection Method 701, the CPU 401 overlaps the paper thickness setting screen 770 illustrated in FIG. 5B on the current screen on the LCD touch panel 600, and receives the selection of a paper thickness setting.

In step S1309, the CPU 401 determines whether the selection of the OK key 774 is received. When the selection of the OK key 774 is received (YES in step S1309), the processing proceeds to step S1310.

In step S1310, the CPU 401 stores the information about the paper thickness (Thick Paper 771, Plain Paper 772, or Thin Paper 773) selected at this time, as the Specified Paper Thickness Setting 703 in the Apparatus Settings area 700 of the RAM 406.

In the present exemplary embodiment, the case has been described where, when an accessibility function is in operation, the CPU 401 sets "Thin Paper" as the Specified Paper Thickness Setting 703 in the Apparatus Settings area 700 of the RAM 406. However, the present exemplary embodiment is not limited thereto. For example, the CPU 401 may set "Plain Paper" as the Specified Paper Thickness Setting 703.

Other Embodiments

Exemplary embodiments of the present disclosure can also be implemented by processing in which a program for implementing one or more functions according to the above-described exemplary embodiments is supplied to a system or apparatus via a network or storage medium, and at least one processor in a computer of the system or apparatus reads and executes the program. Furthermore, the exemplary embodiments can also be implemented by a circuit (e.g., an application specific integrated circuit (ASIC)) for implementing one or more functions according to the exemplary embodiments.

While the exemplary embodiments of the present disclosure have been described in detail above, the present disclosure is not limited to the specific exemplary embodiments.

Each of the above-described exemplary embodiments allows the thickness of a document to be automatically set and prevents display of a document thickness selection screen, depending on the function being performed by the user, thereby making it possible to achieve optimum settings without degrading user operability.

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may include one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-010143, filed Jan. 24, 2020, which is hereby incorporated by reference herein in its entirety.

What is claimed is:

1. An image reading apparatus comprising:
one or more memories that store instructions; and
one or more processors configured to execute the instructions stored in the one or more memories to perform operations including:
making a setting for asking a user to specify a paper thickness of a document via a paper thickness setting screen each time the document is detected,
detecting an operation mode of the image reading apparatus, and
controlling whether or not to display the paper thickness setting screen, based on the detected operation mode, when the document is detected in a state where the setting is made.

2. The image reading apparatus according to claim 1, wherein executing the instructions performs further operations including:
conveying the document at a speed that is based on the paper thickness specified via the paper thickness setting screen, and
reading the conveyed document to generate the image.

3. The image reading apparatus according to claim 1, wherein the operation mode is a mode in which an accessibility function is in operation.

4. The image reading apparatus according to claim 3, wherein the accessibility function includes at least one of a screen color inversion function, a voice guidance function, or a voice operation function.

5. The image reading apparatus according to claim 3,
wherein, if the accessibility function is in operation, the paper thickness setting screen is not displayed when the document is detected in a state where the setting is made, and
wherein, if the accessibility function is not in operation, the paper thickness setting screen is displayed when the document is detected in a state where the setting is made.

6. The image reading apparatus according to claim 3, wherein, if the accessibility function is in operation, the paper thickness setting screen is not displayed when the document is detected in a state where the setting is made, and the paper thickness is set to a predetermined value.

7. The image reading apparatus according to claim 1, wherein the operation mode is an automatic gradation correction mode.

8. The image reading apparatus according to claim 7,
wherein, if the automatic gradation correction mode is in operation, the paper thickness setting screen is not displayed when the document is detected in a state where the setting is made, and
wherein, if the automatic gradation correction mode is not in operation, the paper thickness setting screen is displayed when the document is detected in a state where the setting is made.

9. The image reading apparatus according to claim 7, wherein, if the automatic gradation correction mode is in operation, the paper thickness setting screen is not displayed when the document is detected in a state where the setting is made, and the paper thickness is set to a predetermined value.

10. The image reading apparatus according to claim 1, wherein, in addition to the setting for asking the user to specify the paper thickness of the document via the paper thickness setting screen each time the document is detected, the setting includes a setting for setting the paper thickness of the document into a predetermined value.

11. The image reading apparatus according to claim 1, wherein the image reading apparatus does not includes a paper thickness sensor.

12. A method for an image reading apparatus, the method comprising:
- making a setting for asking a user to specify a paper thickness of a document via a paper thickness setting screen each time the document is detected;
- detecting an operation mode of the image reading apparatus; and
- controlling whether or not to display the paper thickness setting screen, based on the detected operation mode, when the document is detected in a state where the setting is made.

13. A non-transitory computer-readable storage medium storing a program to cause a computer to perform a method for an image reading apparatus, the method comprising:
- making a setting for asking a user to specify a paper thickness of a document via a paper thickness setting screen each time the document is detected;
- detecting an operation mode of the image reading apparatus; and
- controlling whether or not to display the paper thickness setting screen, based on the detected operation mode, when the document is detected in a state where the setting is made.

* * * * *